(12) United States Patent
Brown et al.

(10) Patent No.: US 7,013,345 B1
(45) Date of Patent: Mar. 14, 2006

(54) METHOD AND APPARATUS FOR WIRELESS NETWORKING

(75) Inventors: William M. Brown, San Marcos, CA (US); Robert S. Bell, Ocean side, CA (US)

(73) Assignee: Metric Systems Corporation, Vista, CA (US)

( * ) Notice: Subject to any disclaimer, the term of this patent is extended or adjusted under 35 U.S.C. 154(b) by 1153 days.

(21) Appl. No.: 09/594,581

(22) Filed: Jun. 12, 2000

(51) Int. Cl.
*G06F 15/16* (2006.01)

(52) U.S. Cl. .................. 709/236; 709/223; 709/224; 709/238

(58) Field of Classification Search .............. 709/224, 709/236, 238, 223
See application file for complete search history.

(56) References Cited

U.S. PATENT DOCUMENTS

| | | | |
|---|---|---|---|
| 5,924,030 A | | 7/1999 | Rautiola et al. ............ 455/426 |
| 6,052,725 A | | 4/2000 | McCann et al. ............ 709/223 |
| 6,084,969 A | | 7/2000 | Wright et al. ............... 380/271 |
| 6,418,324 B1 | * | 7/2002 | Doviak et al. ........... 455/426.1 |
| 6,469,639 B1 | * | 10/2002 | Tanenhaus et al. .... 340/870.16 |
| 6,499,114 B1 | * | 12/2002 | Almstead et al. ............. 714/25 |
| 6,505,247 B1 | * | 1/2003 | Steger et al. ............... 709/224 |
| 6,651,190 B1 | * | 11/2003 | Worley et al. ................ 714/43 |

* cited by examiner

*Primary Examiner*—Saleh Najjar
(74) *Attorney, Agent, or Firm*—Jerry R. Potts

(57) ABSTRACT

A method and apparatus for wireless networking employs a wireless protocol module and a wireless device interface module for controlling a remote terminal unit, whereby the modules integrate the remote terminal unit software and wireless networking application software.

2 Claims, 39 Drawing Sheets

| Select for Detailed Display | | | |
|---|---|---|---|
| Success | IP Address | Name | Description |
| 100% | 192.7.2.2 | Station 7 | Firehall 1 |
| 100% | 192.1.2.1 | Station 1 | CNX1 |
| 100% | 192.2.2.1 | Station 2 | CNX2 |
| 100% | 192.3.2.1 | Station 3 | CNX3 |
| 100% | 192.4.2.2 | Station 4 | BNX4 |
| 100% | 192.5.2.2 | Station 5 | RNX5 |
| 100% | 192.8.2.2 | Station 8 | Maple Ridge Firehall 1 |
| 100% | 192.9.2.5 | Station 9 | Maple Ridge Firehall 3 |

[Details]   [Done]

FIG. 10

Integrity Results

IP Address: 192.10.2.2

Name: Station 10

Description: Maple Ridge Fire Hall

RESET    OK

Round Trip Times (ms)

| Low Deviation | Mean | High Deviation | Percent Success |
|---|---|---|---|
| 108 | 628 | 148 | 100 |
| 270 | 1001 | 10000 | 1000 |

FIG. 11

File Transfer

New Transfer: Send, Receive, Done

Completion Status: Check, Cancel

FIG. 12

METHOD AND APPARATUS FOR WIRELESS NETWORKING

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Technical Field

The present invention relates in general to a method and apparatus for wireless networking. The invention more particularly relates to wireless networking router systems for facilitating communications via wireless transmission, in a more efficient and reliable manner.

2. Background Art

In industrial automation it becomes necessary to gather information from several remote sites and use that information to control operations at the remote sites. The data is gathered by using various types of transducers that measure the physical variables (such as temperature, revolutions per minute, etc.) and convert them into electrical signals. Similarly the remote equipment can be controlled by using mechanisms that convert electrical signals into physical motion such as turning a valve or operating a switch. A Remote Terminal Unit (RTU) is the interface between these electrical signals and a communications medium. Remote Terminal Units are also known as Logic Controllers and Programmable Logic Controllers (PLC).

An RTU will convert the electrical signals into digital representations and send them on a digital communications channel. They will also receive digital data from the communications channel and convert it into electrical signals for control of the equipment at the site. Various communications protocols have been invented to carry the data on various types of communications channels. The most typical communications channel is a multidrop asynchronous serial channel with a "master" station that controls access to the channel and several "slave" stations that communicate, one at a time, with the master station. An RTU would be one of the slave stations and a central data processor would be the master. Several communications protocols, such as MODBUS, have been invented to handle this architecture. This type of protocol typically has the data gathering program at the master computer site request data from one slave station at a time and send data to one slave at a time. The control program has complete control over the activity on the communication channel.

Occasionally the situation exists where it is difficult to place all of the RTUs on a wire channel. This most often happens when the distances between the RTUs are too great for wire connections. It also happens when there are physical or economic or legal barriers to making the wire connections. In these cases a wireless connection is needed. Since the operational characteristics of radios are very different from those of wires, the use of radio has exposed serious weaknesses in the master/slave model of communications. The master/slave communications model assumes that there is a master that can control a single channel that is also available to all of the slaves.

It is frequently impossible or at least very difficult, to get a radio signal from a central master site to all of the slave sites. Even when there is a place where a master station could be put so that it can communicate with all of the slave stations, this place is frequently not a good place to locate the data gathering program (such as a mountain top.) The normal solution to these problems involves a series of repeater stations, all still under the control of the data gathering program. In essence extra radio channels have been added, but are being used as if they were a part of a single channel. This means that when one of the channels is operational other channels must be still, even when the separate channels do not conflict in any physical way with each other.

Internet Protocol has attempted to solve this problem by removing the control of the networks and links from the application (such as the data gathering program.) The application program sends data to the address of the destination and is not concerned with the processing and communication necessary to actually move the data. All of the channels can be used to their capacity without impacting the application program.

Recently some RTUs have begun to use the Internet Protocol (IP) using ethernet communications. Using IP protocol allows having a router on the same ethernet. An IP router, such as the one marketed under the tradename "MAVRIC" by Metric Systems Corp., of Carlsbad, Calif., can allow access to wireless transmission of the data across a network of arbitrary topology, by interconnecting ethernet or other inputs to the flexibility of the topology offered by IP routing allows placement of radios wherever they are needed for connectivity. The combination of an RTU using IP on an ethernet channel and an IP router on the same ethernet channel solves all the topological problems of using wireless communications for data acquisition and control.

While such a system has proven highly successful, it would be desireable to have a more band width utilization efficient system to operate at a variety of different bands.

SUMMARY OF THE INVENTION

The principal object of the present invention is to provide a new and improved method and apparatus for facilitating wireless networking.

Another object of the present invention is to provide such a new and improved method and apparatus which are more band width utilization efficient.

Briefly, the above and further objects of the invention are realized by providing an improved technique for greatly improving the band width utilization efficiency.

A method and apparatus for wireless networking employs a wireless protocol module and a wireless device interface module for controlling a remote terminal unit, whereby the modules integrate the remote terminal unit software and wireless networking application software.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIGS. 1–46, illustrate the method and apparatus of the present invention.

BEST MODE FOR CARRYING OUT THE INVENTION

Figure 1:
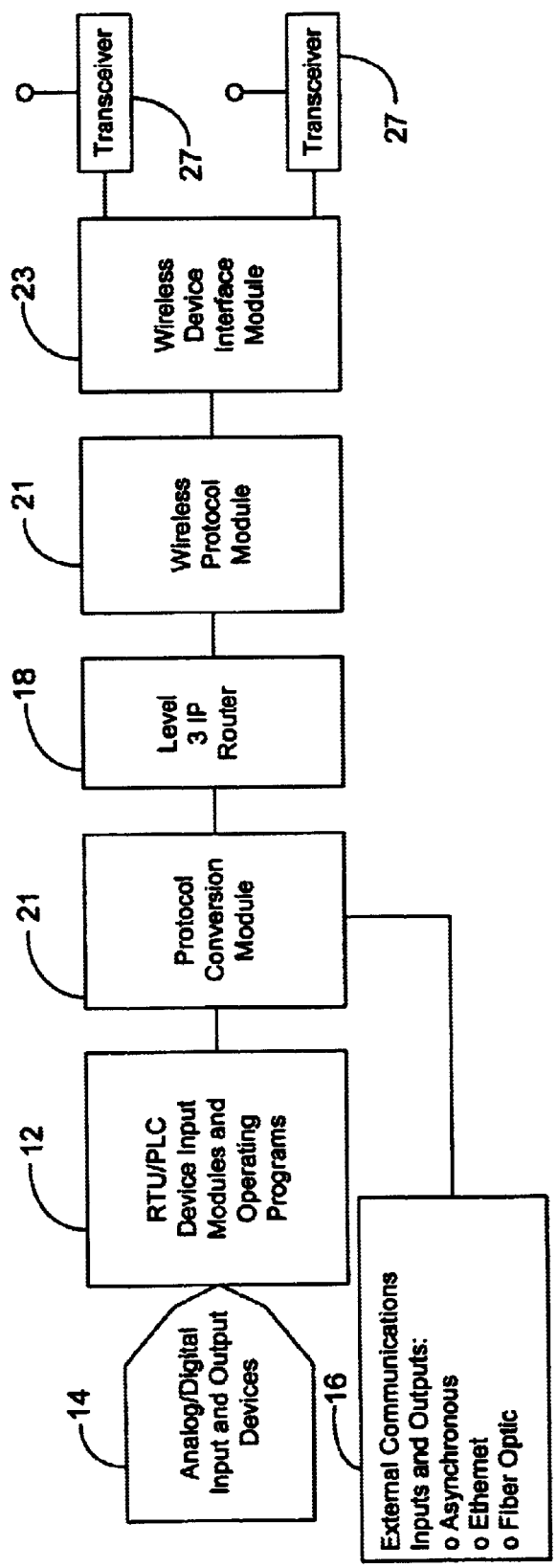

Referring now to the drawings, and more particularly to FIG. 1 thereof, there is shown a wireless internetworking Embedded RTU/PLC system 10, which is constructed in accordance with the present invention. The system 10 sensor device input modules 12 which respond to a variety of inputs such as a analog or digital input 14, an asynchronous input 16 as well as other possible inputs.

The system also includes a device protocol conversion module 21 which converts the instrumentation time discrete information into an Internet Protocol that can be routed and serviced by the embedded router.

The system 10 also includes a level 3 router module 18, which internally routes data packets. The protocol conversion module 21 converts the time discrete information into an Internet Protocol (IP) base protocol. A wireless protocol module 22 creates reliable links to multiple users within the radio range of each transceiver. A wireless device interface module 23 provides interface requirements for a given radio transceiver generally indicated at 27.

The following is a table explaining the function of the system modules:

Basic System Operation:

| Module | Function |
| --- | --- |
| RTU/PLC Input device | Converts Physical and virtual parameters datagrams that are bi-directional transferred to the protocol conversion module. |
| Protocol Conversion module | Converts the Instrumentation time discrete information into an IP base protocol that can be routed and serviced by the embedded IP router. |
| Level 3 Internet protocol Router | Internally routes the instrumentation data packets to the appropriate wireless cell also maintains internal network map of all connecting links. |
| Wireless protocol Module | This module manages five functions required to create reliable links to multiple users within the radio range of each attached transceiver: |
| Wireless Device Interface Module | Provides the specific physical interface requirements to support various types of wireless radios and physical interfaces; i.e. RS-232/Ethernet/RS-530/etc. |

When the system 10 is shown and described as being preferrably useful in connection with control and monitor functions in an industrial automation process, the system of the present invention can also be used for a variety of different applications, including, but no limited to, telephony, permanent virtual circuits, lease lines, frame delays and others.

Each of the asynchronous ports can be user configurable as

A wireless network gateway supporting a point-to-point or multi-point portal.

An Asynchronous IP gateway e.g. a SLIP port

Or as an dedicated point-to-point permanent virtual circuit—much like a dedicated circuit.

| |
| --- |
| The basic system Five (5) communication ports provisioned as four asynchronous Comm ports and one 10base T Ethernet port. Y Comm 1/ J1 is a RS-232/RS-485 port |
| Y Comm2/J2 is a RS-232 port Y Comm3/J3 is a RS-232 port Y Comm4/J4 is a RS-232 port Y J5 is a 10Base T Ethernet port J6 is the Input Power connector. |

Initialization String

The initialization string file gives the system its overall "personality". The lines in the file may appear in any order. All characters in the file are converted to upper case before being examined. The items, which may appear in this Section, are:

"NAME=" The value of this parameter is a string of characters with no embedded blanks. Each system in a network may be named. The name is displayed on the video display and is returned with the status when a "MavWatch" remote status request is made. The name has no effect on the operation of the system.

Example:

NAME=Vista_Point

"ROUTE DISCOVERY=" The value of this parameter is "ON" or "OFF" (default "OFF".) systems can exchange routing information using the Internet Protocol RIP2. RIP2 causes each node in the network to forward its routing table to all neighboring nodes (that are within the same Autonomous System.) As the routing information is propagated, each node eventually becomes aware of the routes to all of the nodes in the network. Normally this function should be enabled. However, when it is desired to save radio bandwidth by having all routes entered into a static table, the route discovery function can be turned off.

Example:

ROUTEDISCOVERY=ON

"DISCOVERY INTERVAL=" The system periodically sends RIP2 updates to its neighbors in accordance with the IP RIP2 specification. The interval of that period can be set with this parameter. The value of the parameter is the interval in minutes (default 5.)

Example:

DISCOVERY INTERVAL=1

"ROUTER=" The value of this parameter is the IP addresses of an external router entered as either dotted decimal (e.g., 192.0.1.13) or as a hexadecimal number (e.g., C000010D). If this parameter is specified, all unroutable packets will be sent to this address. Of course there must be a route to this address. In most cases it will be discovered by RIP2; however, some systems must have it specified as a static route.

Example:

ROUTER=192.0.1.13

"BOOTP=" The value of this parameter is the IP address of a BOOTP server entered as either dotted decimal (e.g., 192.0.1.13) or as a hexadecimal number (e.g., C000010D). The system can act as a BOOTP relay agent so that hosts on the Intranet can download their operational values (including their IP address) from a BOOTP (or related) server.

Example:

BOOTP=192.0.2.125

3.2 Devices Section of the Initialization String

Each line in the devices section file defines an IP address and link type. The format of each line is:

Link Name, Link IP Address; or

Link Name, Link IP Address, X;

The final parameter "X", indicates that this is an external link out of the Autonomous System of systems. No routing information is automatically exchanged across this link. In the absence of the final parameter, the link is internal and routing information is exchanged, if route discovery is turned on (see mavnet.ini.)

The Link IP Address is the IP address of this end of the link (other ends of the same link have different IP addresses) entered as either dotted decimal (e.g., 192.0.1.13) or as a hexadecimal number (e.g., C000010D).

The Link Name can have one of the following formats:

"PFx", The link uses the "Pathfinder" point to multi-point link level protocol (half duplex links also use this protocol.) The x character denotes the multi-point cell for this link; it may be any character. Normally, the cells are labeled "PFA", "PFB", "PFC" etc. Having a "PFx" link demands that a PFX Section file also be present in the same initialization string.

"SLPn", The link uses the IP SLIP framing on a full duplex connection on COM port n. A "comm n Section file will be examined, for additional parameters associated with the COM port. A slip n Section file will be examined for additional parameters for the SLIP port. The number of SLIP ports per system node is controlled by the number of asynchronous RS-232 ports and corresponding free interrupts.

System IP Routing

Each system 10 uses static or dynamic routing tables to decide where to send a packet. The routing table is a list of all the network segments that IP knows how to reach. If the network is operating in the Automatic Route Discovery Mode, the routes are being verified and updated as often as required, otherwise the system uses fixed (static) routes. External links must have the routes defined in the ROUTES.INI file.

A static route is a route that never changes and that you must enter when manually configuring your IP addresses and system Network. Static routes persist across power-downs, restarts, and software reloads. They are used when the router for some reason cannot determine the correct route dynamically, or to provide a link to an external address. IP routing happens as follows:

1. The system IP router receives the packet and reads the 32-bit destination address found within the packet header.

2. If the packet is destined for this router, further routing is not necessary and the IP hands the packet to the appropriate internal software module. Packets in this category include the following:

Control packets for IP itself

Routing update packets

Packets used for diagnostic purposes

3. If the packet is destined for a host on a directly-connected network segment, IP matches the 32-bit destination address with the appropriate physical address table. IP then hands the packet to the appropriate lower-level protocol module for transmission directly to the destination node.

4. If the packet is destined for a host on a remote network segment, IP uses the routing table to determine which router leads to that network segment. Each entry in the routing table contains a destination address and the IP address of the next hop router. If IP matches the destination address in the table with the destination contained in the packet the packet is handed to the appropriate lower-level protocol module for transmission to that next hop.

5. If the packet has no entry for its IP address in the routing table, the packet is routed to the default router. Default routers are used to route the packets whose destination address is not found in the routing table. This router is assumed to know the location of the packets destination.

Static Route Configuration

Figure 2:
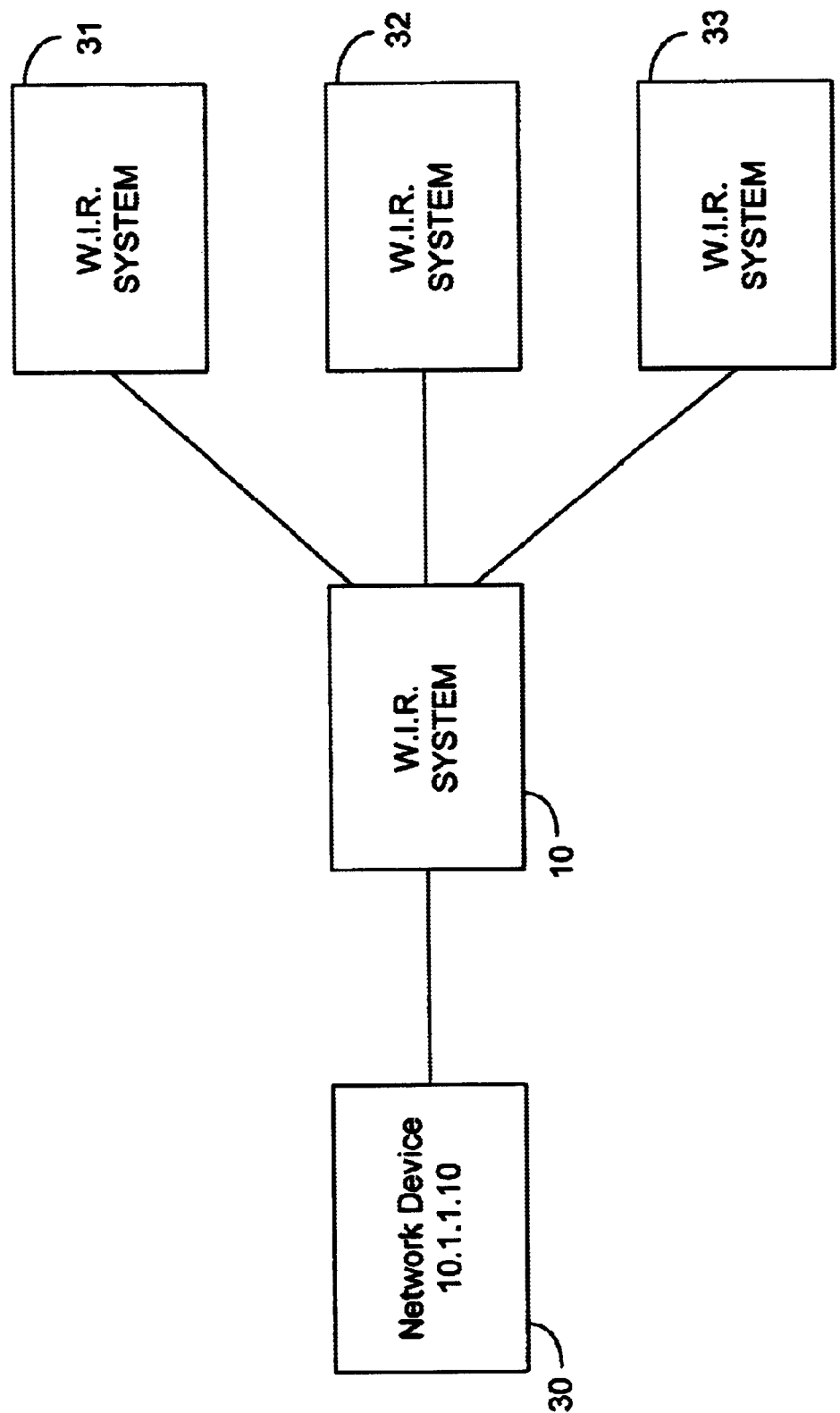
Figure 3:
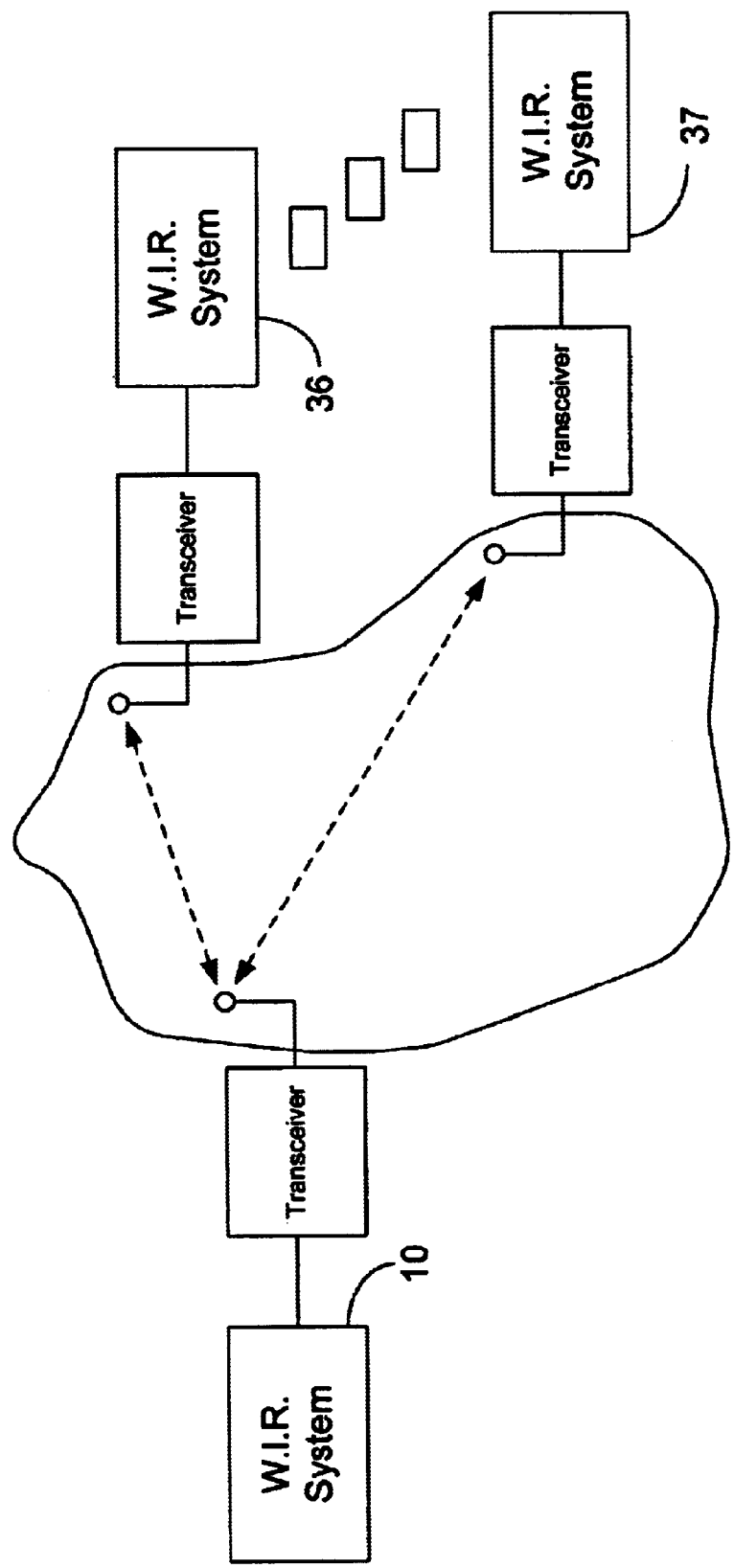
Figure 4:
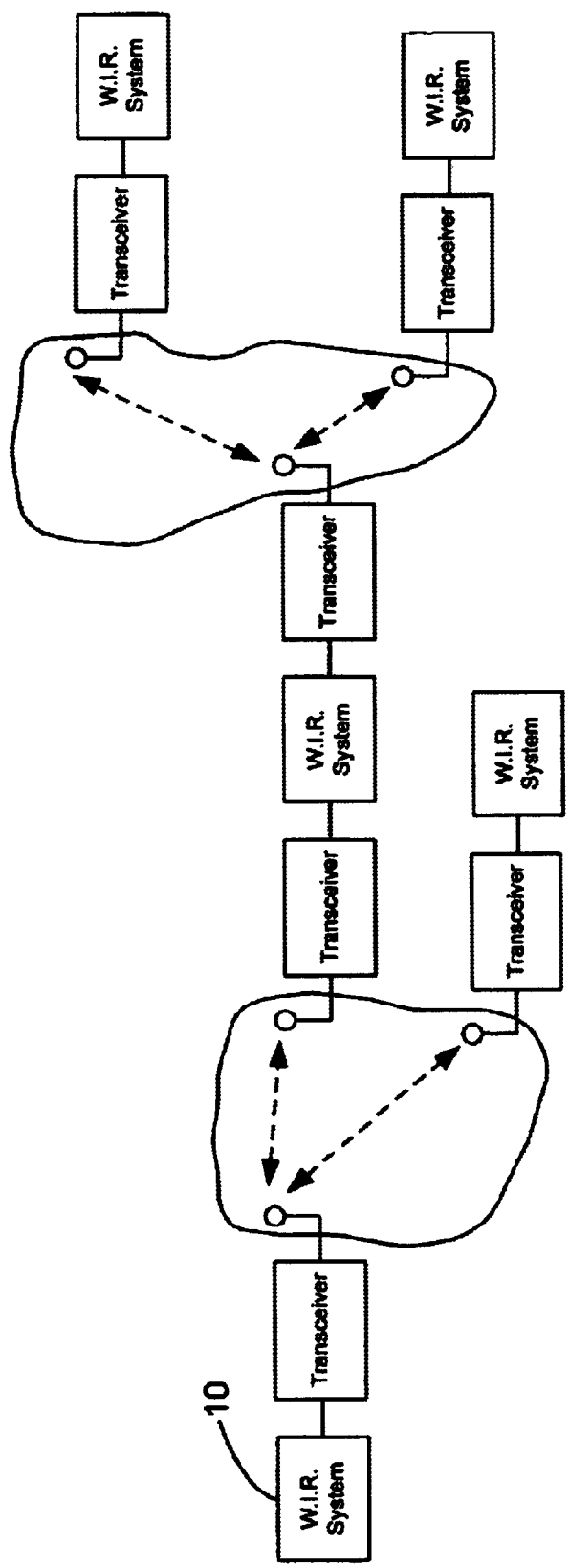
Figure 5:
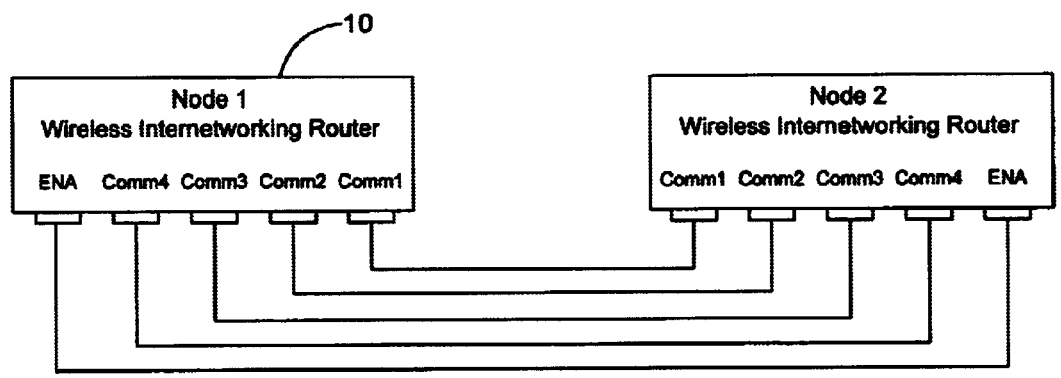

Referring now to FIG. 2, there is shown a static route configuration where the system 10 is responding to a network device 30, and in turn wirelessly communicates with like system units 31, 32 and 33. The system units 31, 32 and 33 are each similar to the system 10.

Static Routes Example

Each line in the routes section of the initialization string file has the following format:

Destination IP Address, IP Subnet Mask Local Link (gateway) IP Address;

Example: 192.12.13.45, FFFFFFFF, 192.34.24.100; or

Destination IP Address, IP Subnet Mask, Local Link (gateway) IP Address, Next Hop IP Address;

Example: 192.12.13.45, FFFFFFFF, 192.34.24.100, 201.22.90.10;

The Destination IP Address gives the address of the final destination as contained in an IP packet, or a subnet address for the final destination. The IP Subnet Mask gives the subnet mask for the destination of the packet. The Local Link (gateway) IP address is one of the IP addresses contained in the "devices.ini" file. The binary intersection ("and") of the destination address of a packet and the subnet mask is compared to the Destination IP Address. If the two are equal, the packet is routed out of the local link specified by the Local Link (gateway) IP Address. A subnet mask is composed of leading (most significant bits) ones followed by trailing zeroes. The same destination may be covered by several different subnet masks. The packet is routed out the link corresponding to the most specific (most one bits) subnet mask. The Next Hop IP Address is used when route discovery is turned off. It allows the pathfinder point to multi-point protocol to associate a pathfinder link address with the destination IP address by finding the link address of the next hop.

Slipn Section of the Initialization String

Each line of the Section defines a parameter of the SLIP link. The parameters are defined as follows "MTU=mtu" "mtu" is a decimal number giving the Maximum Transmission Unit on the SLIP link. The default is 584 bytes.

"TTO=ttp" "ttp" is a decimal number giving the transmission timeout interval in milliseconds. The default is 500.

"KEEP_ALIVE_SIZE=keepAliveSize" "keepAliveSize" is a decimal number that sets the size of the keep alive link level data packets that are interchanged on internal SLIP links. The default is set by the link protocol. Specifying a value less than the default results in the default being used. This parameter is useful for those radios that do not immediately transmit data but store it up until a specific buffer size is filled. By setting the keep alive size parameter, the link level packet can be forced out immediately.

Commn Section of the Initialization String

This Section sets the parameters for serial port "n". Each line sets a single parameter. The parameters are as follows:

"BAUD=baud" "baud" is the number of bits per second transmitted and received by the serial port. It is a decimal number. Any number entered will be converted to the nearest baud divisor. The baud divisor is divided into 115200 to form the actual bits per second used by the serial port. The MAVRIC baud rate should be set to equal the DTEs baud rate.

"PARITY=parity" "parity" may have the values "NONE", "ODD", "EVEN", "MARK", and "SPACE". The default is "NONE". Please note this parameter is set as the same as the DTE's.

"DATA BITS=dataBits" "dataBits" is a decimal number no less than 5 nor larger than 8. The default is 8, entries outside the permitted range result in the default being used. "STOP BITS=stopBits" "stopBits" is either "1" or "2". Numbers larger than 1 result in two stop bits; numbers smaller result in one stop bit. The default is one stop bit. "XON=xon" "xon" is either "0" or "1". The value "1" turns on XON/XOFF flow control. The defuault is "0";

CONFIGURATION EXAMPLES

Example 1

Set COMM1 port to 38.4 kbps and set for software (XON/XOFF) flow control.
Section name: COMM1
BAUD=38400
XON=1

Network Watch Tool

A network tool called "network watch" is designed to test system Wireless Networks. It allows the user to probe network connectivity from any External SLIP port (usually Port 1). It displays packet statistics such as Round Trip Time, Success Rate, Packets Send/Received, and Probe Intervals.

Figure 6:
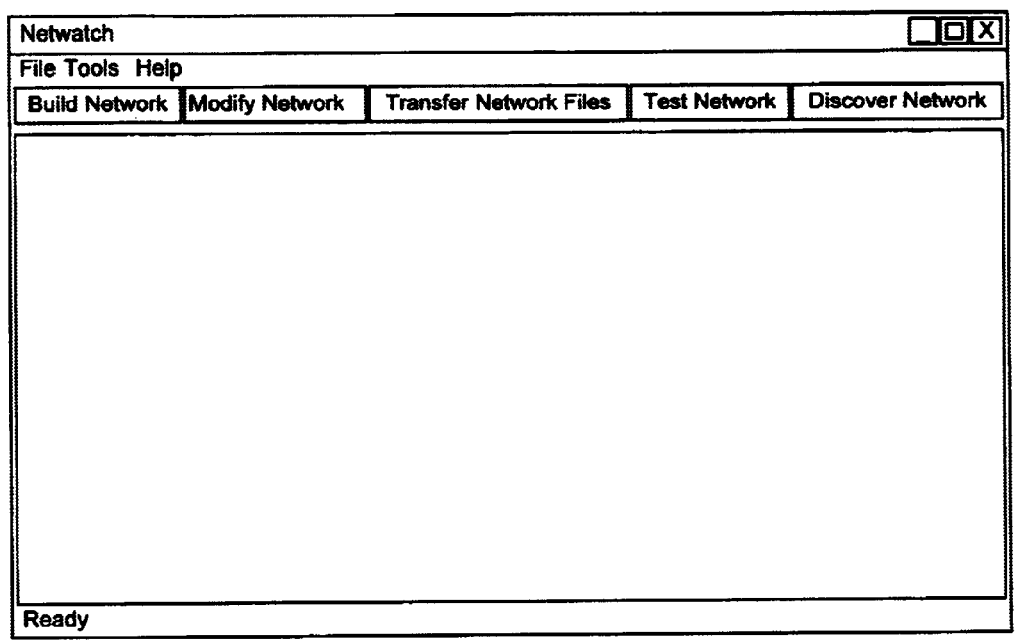

When the network watch tool is started, the screen shown in FIG. 6 is presented.

At this point a user may want to create his or her own test files, or open a stored test file. Included on the network watch floppy disk is a test file PROJECT_NAME.NET designed by Metric Systems Corporation for the user.

Creating a Test File

Figure 7:
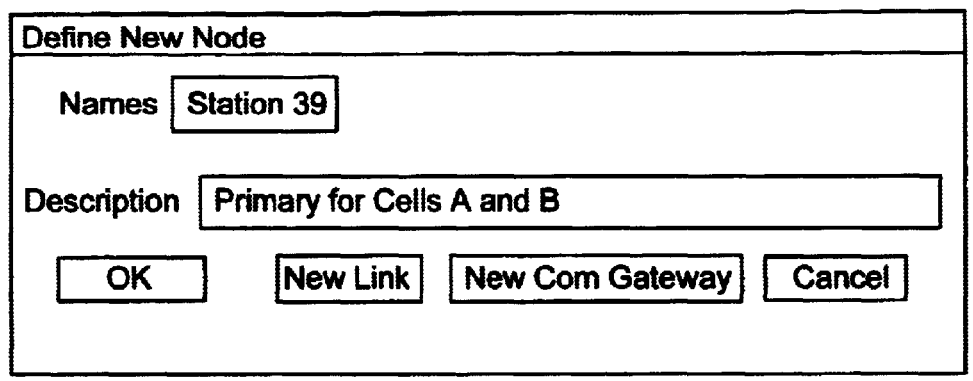

If you wish to create a new NET file, click on the Define button or choose Define under Tools menu. The pop-up Node Definition Action window presents user three choices: New, Modify, and Done. NEW allows user to create a new Node in the network. The screen shown in FIG. 7 appears.

Figure 8:
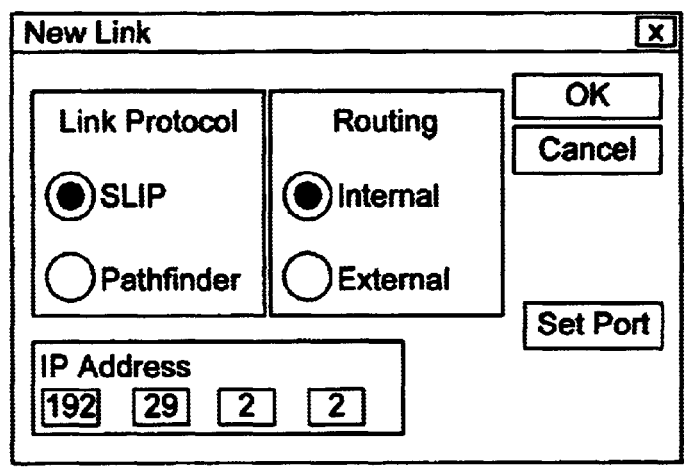

Enter the name of the node and a brief description in the appropriate boxes. Each node may have several devices with different IP Addresses attached to it. Use the New Link button to add as many devices as necessary. The menu shown in FIG. 8 will pop-up.

Choose a link type and enter the address in the appropriate boxes. As shown in the example above, the link is defined as SLIP with an IP Address 192.29.2.2. Check all information carefully and click OK to save the link. Continue adding links until all links on the node are entered, then click OK button in the Define New Node window. This brings you back to the Node Definition Action window. Choose DONE if all of the nodes are defined or NEW to continue adding new nodes.

Figure 9:
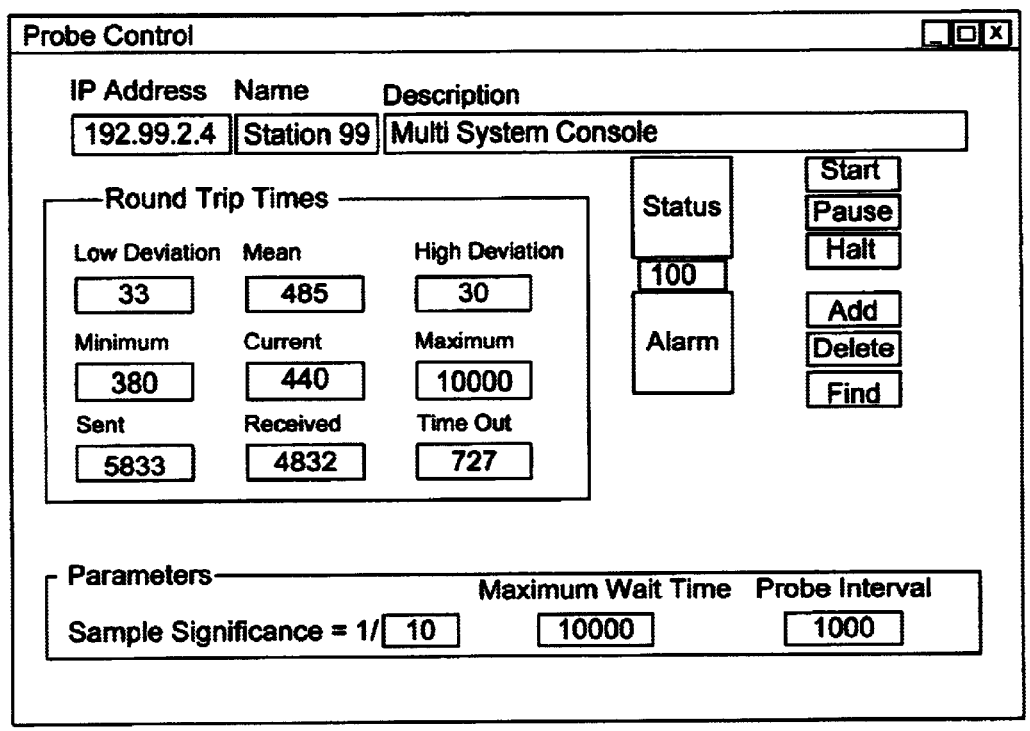
Figure 13:
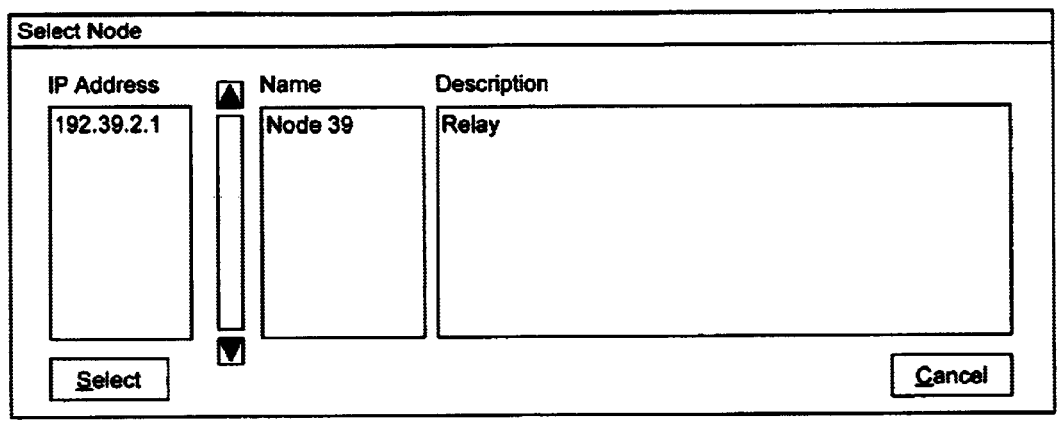
Figure 14:
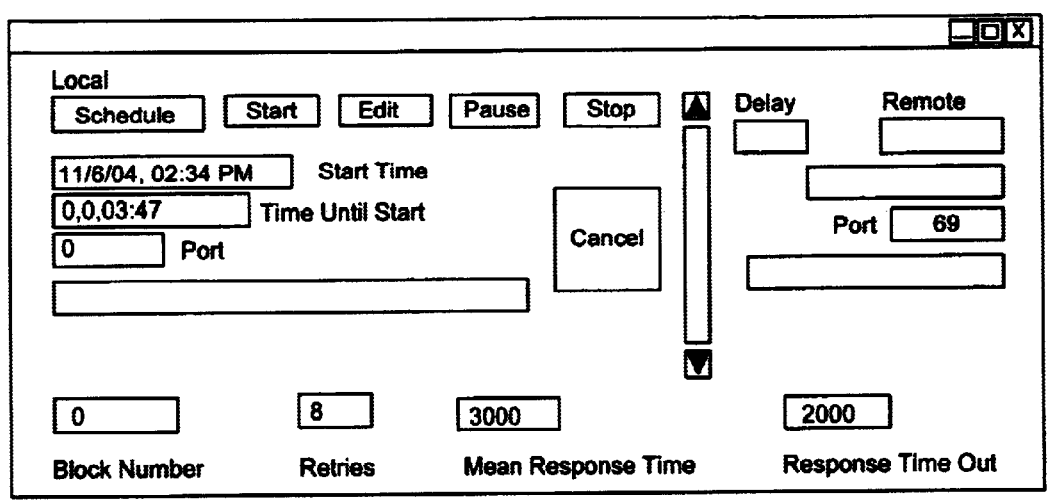
Figure 15:
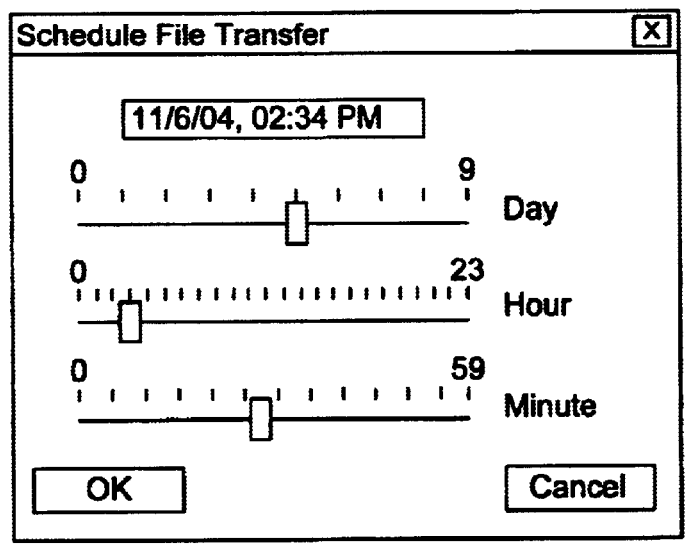
Figure 16:
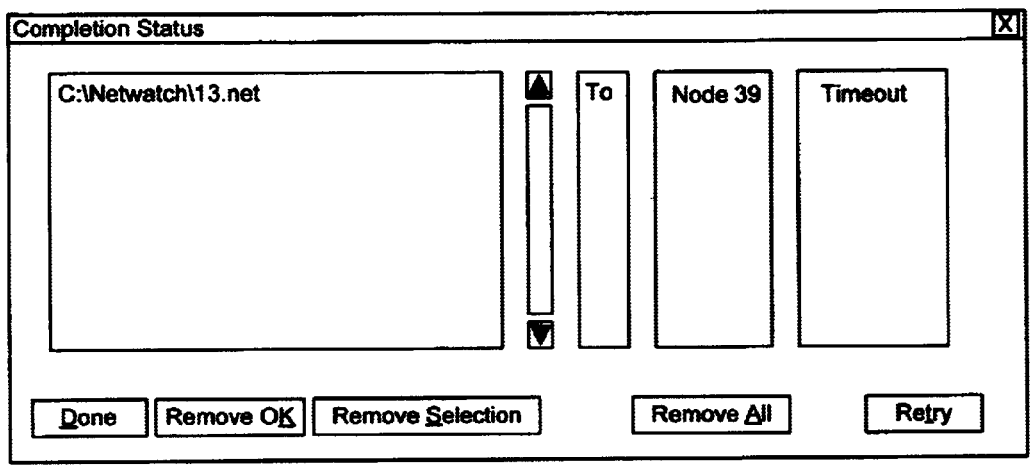
Figure 17:
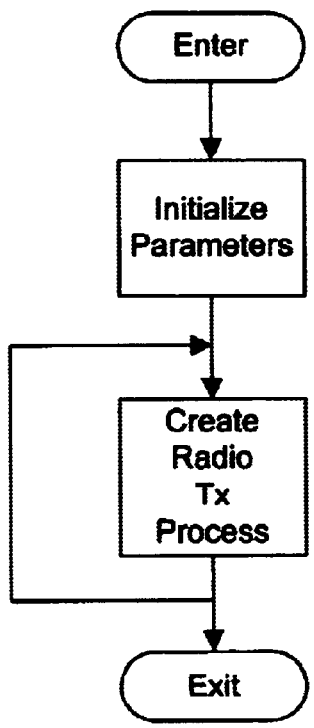
Figure 18:
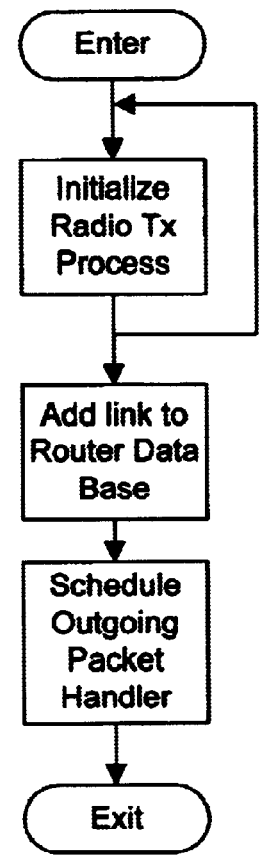
Figure 19:
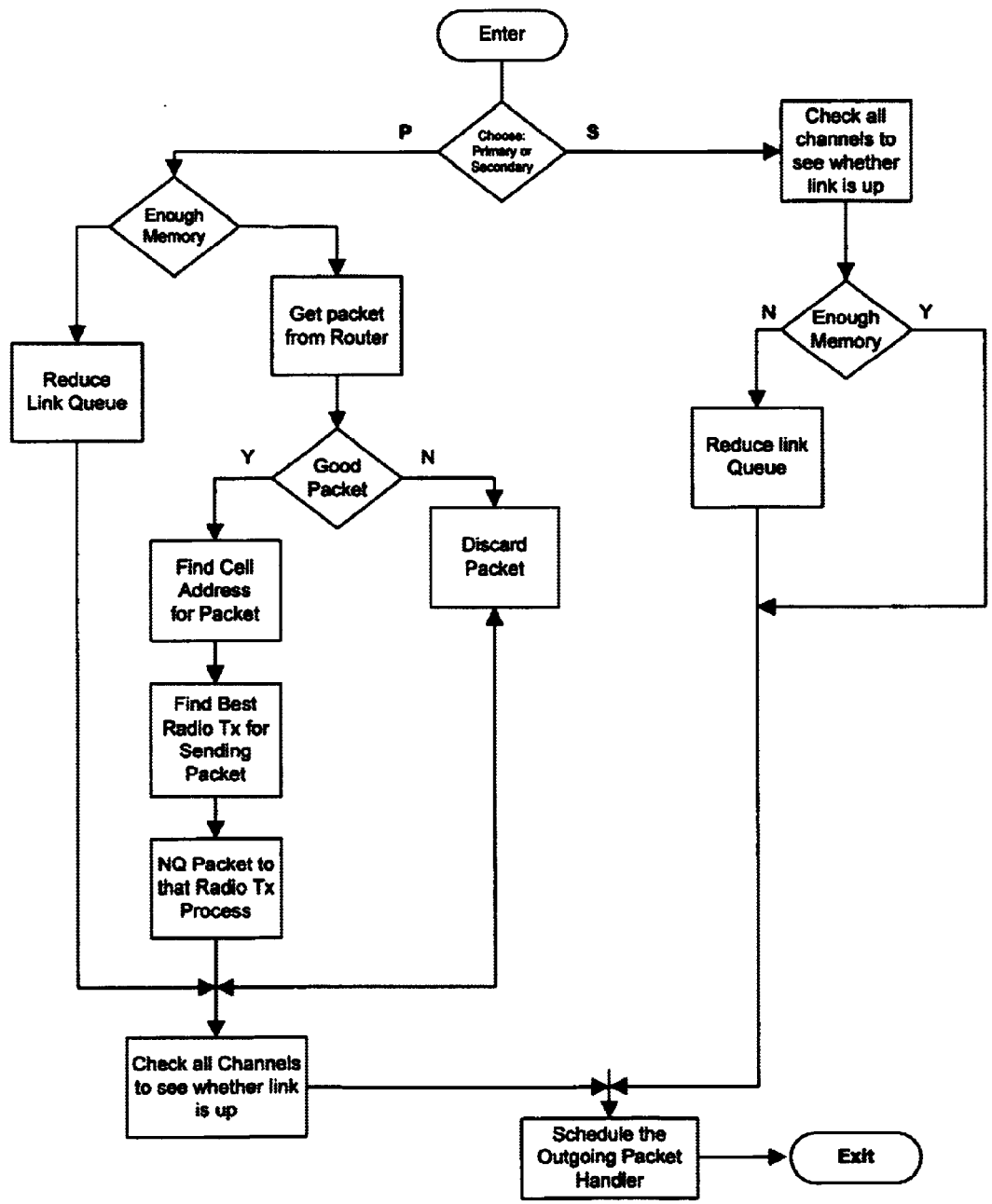
Figure 20:
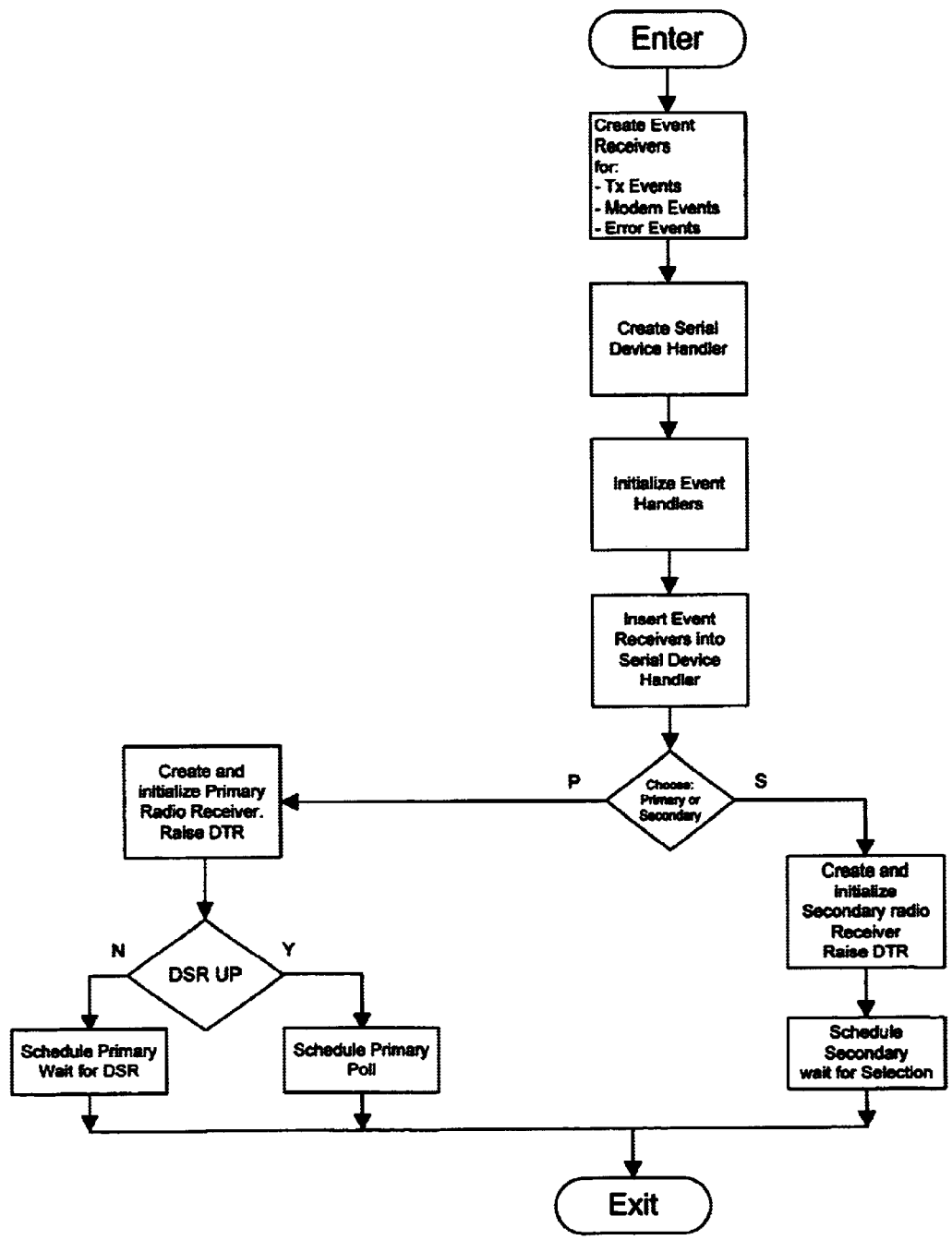
Figure 21:
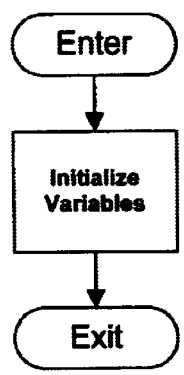
Figure 22:
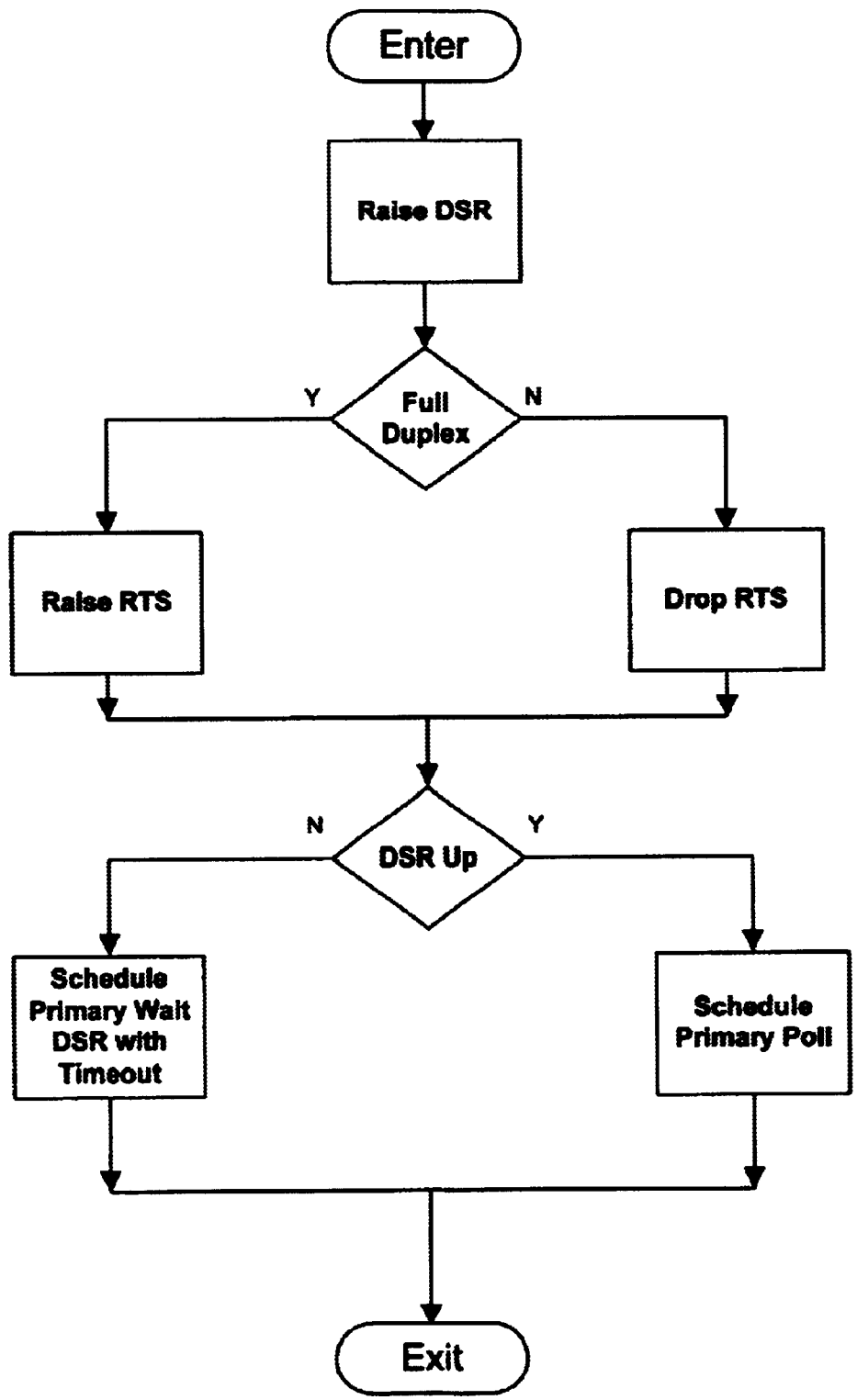
Figure 23:
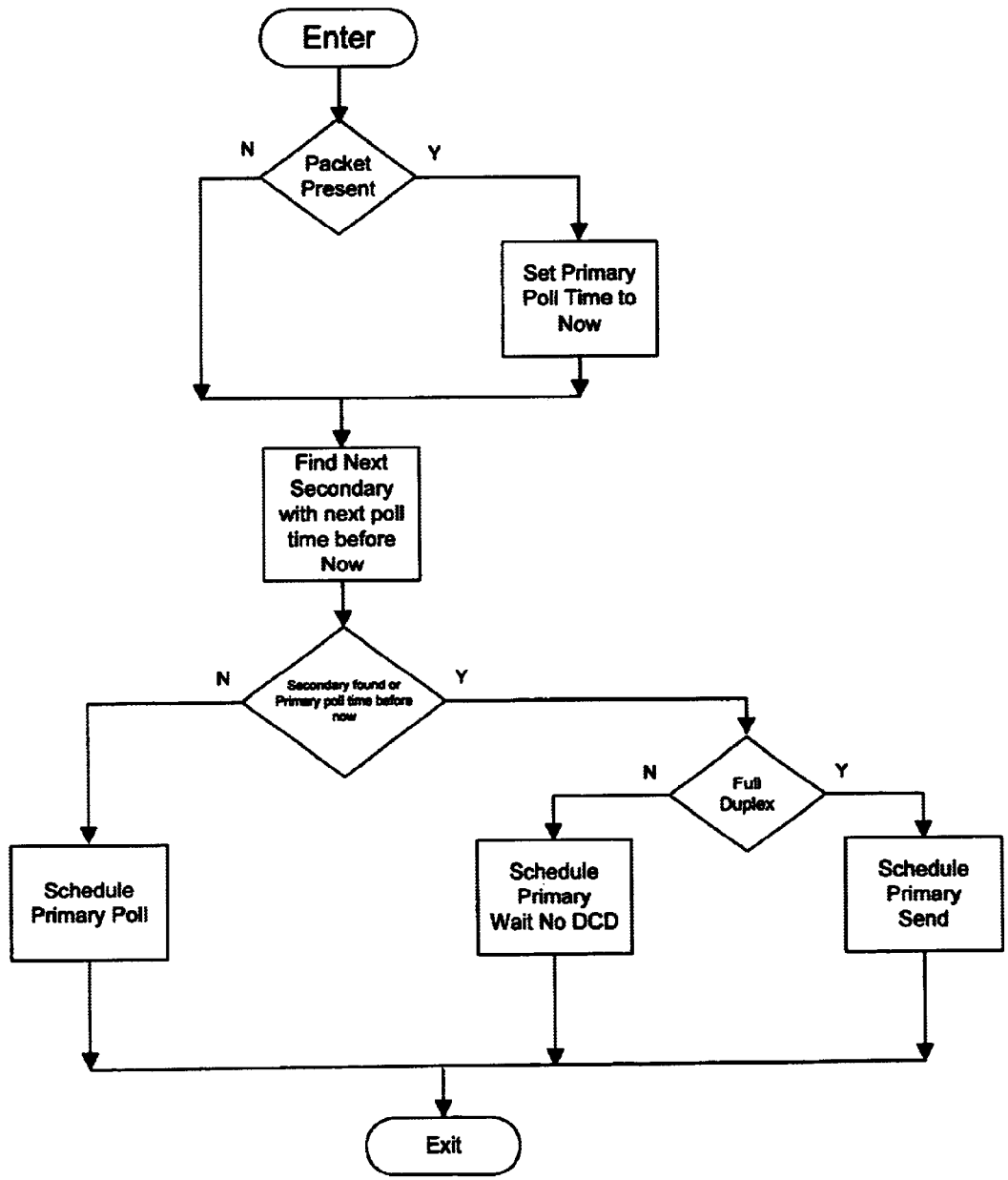
Figure 24:
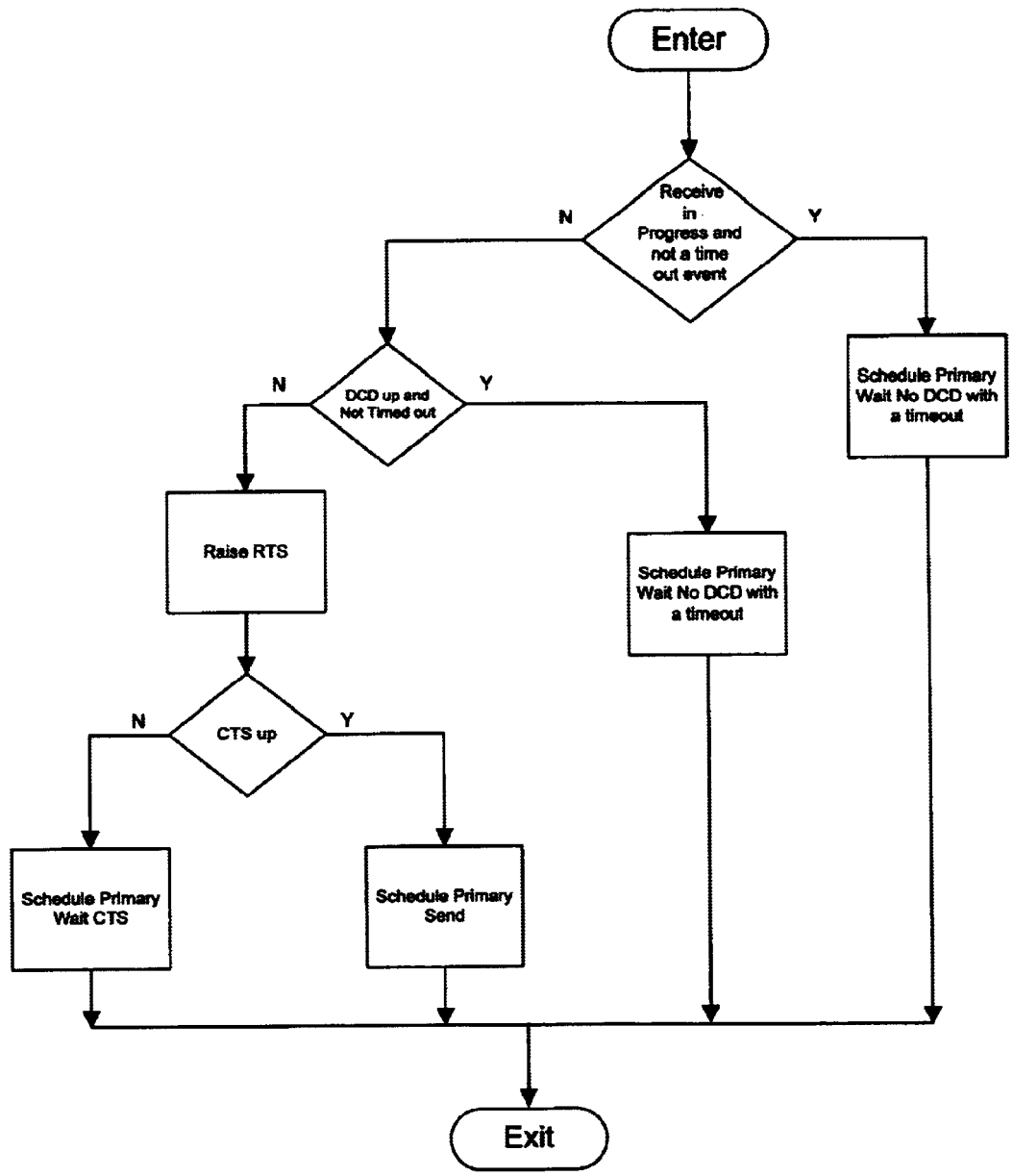
Figure 25:
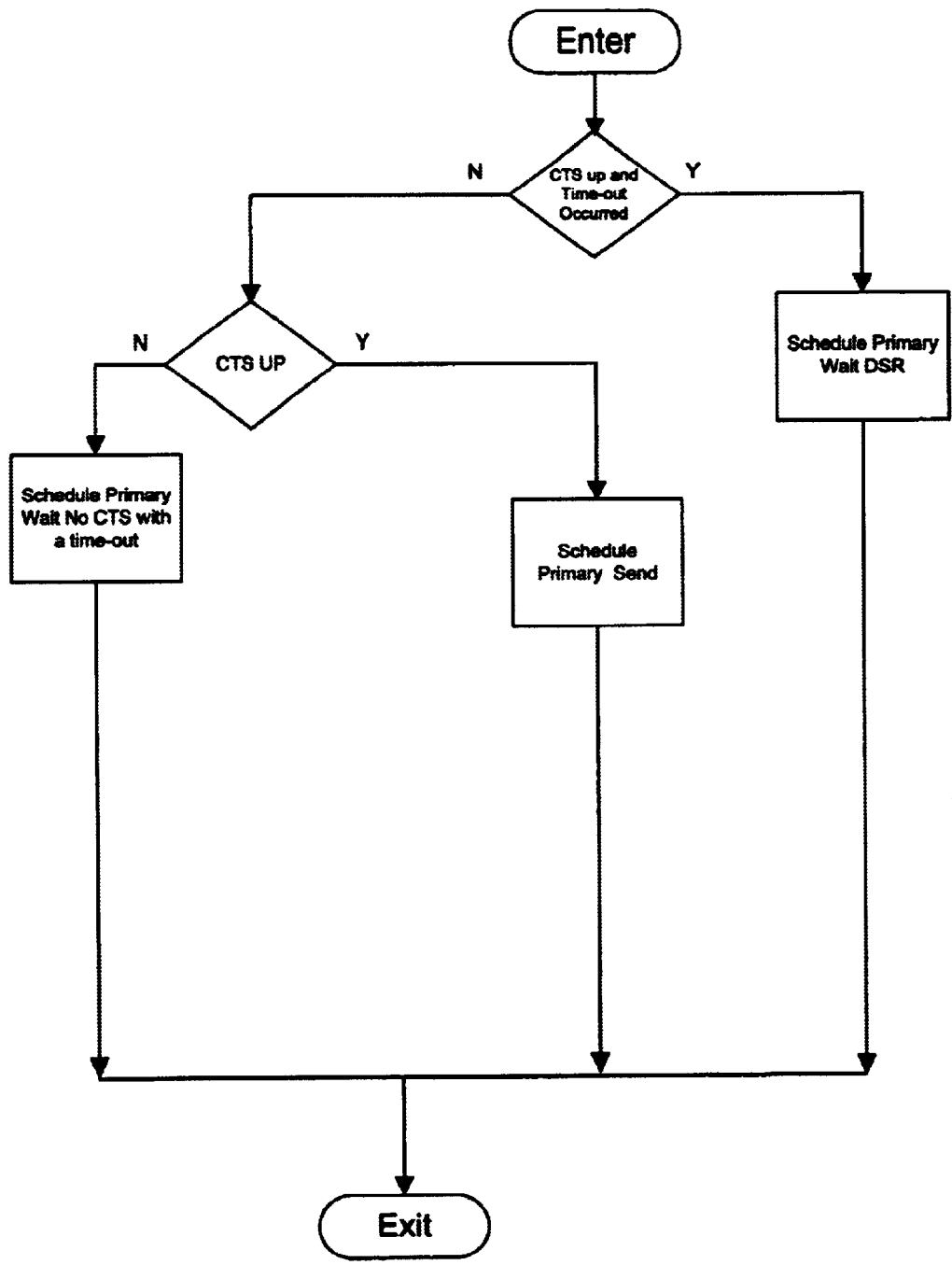
Figure 26:
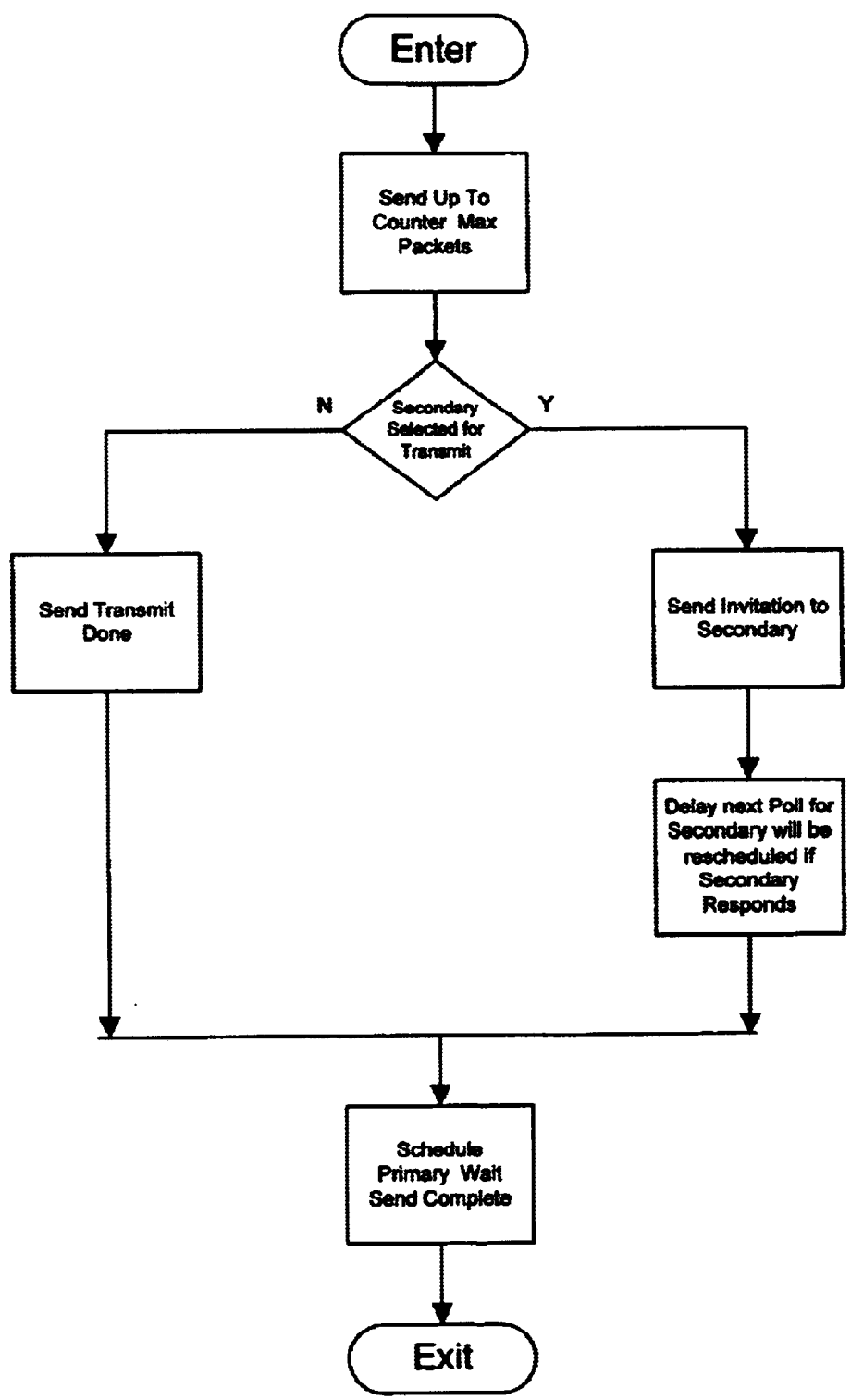
Figure 27:
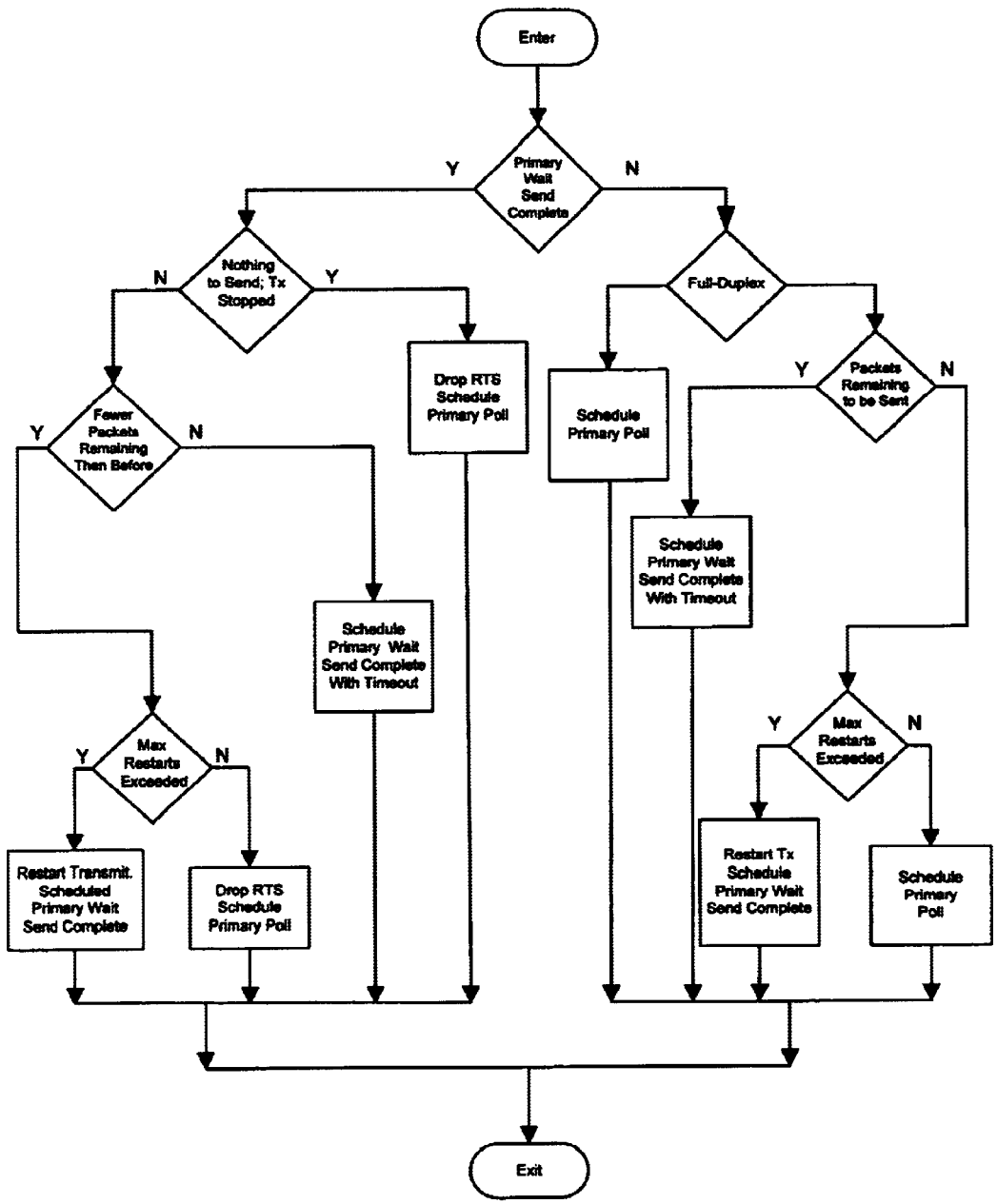
Figure 28:
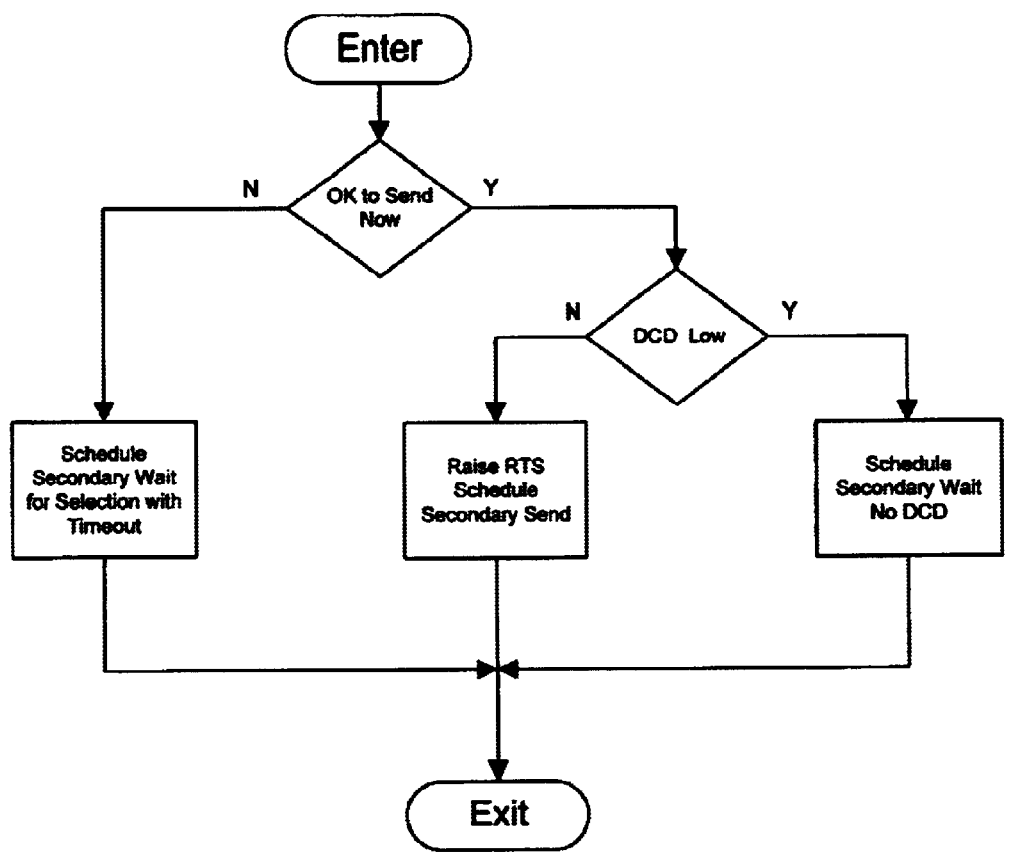
Figure 29:
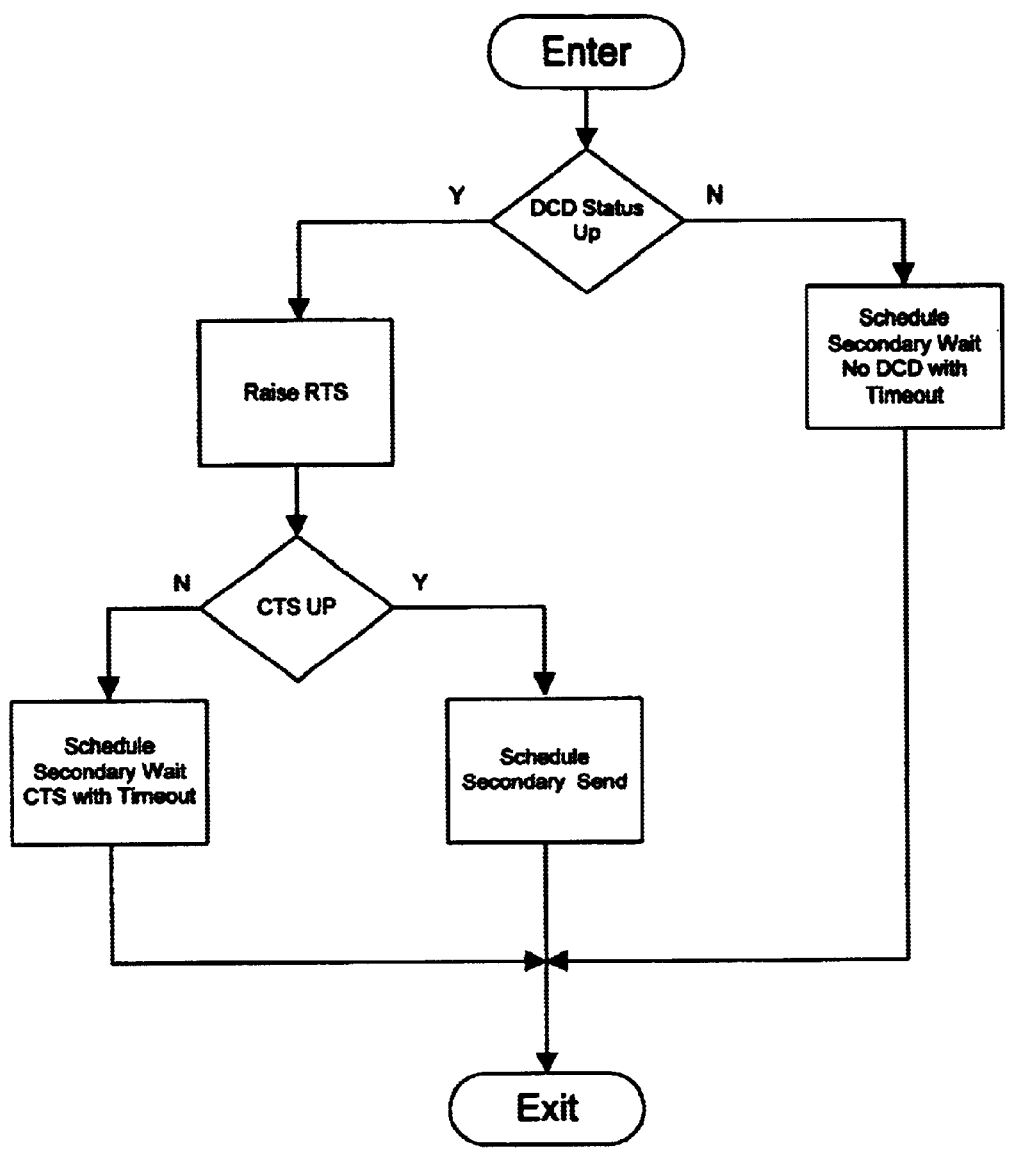
Figure 30:
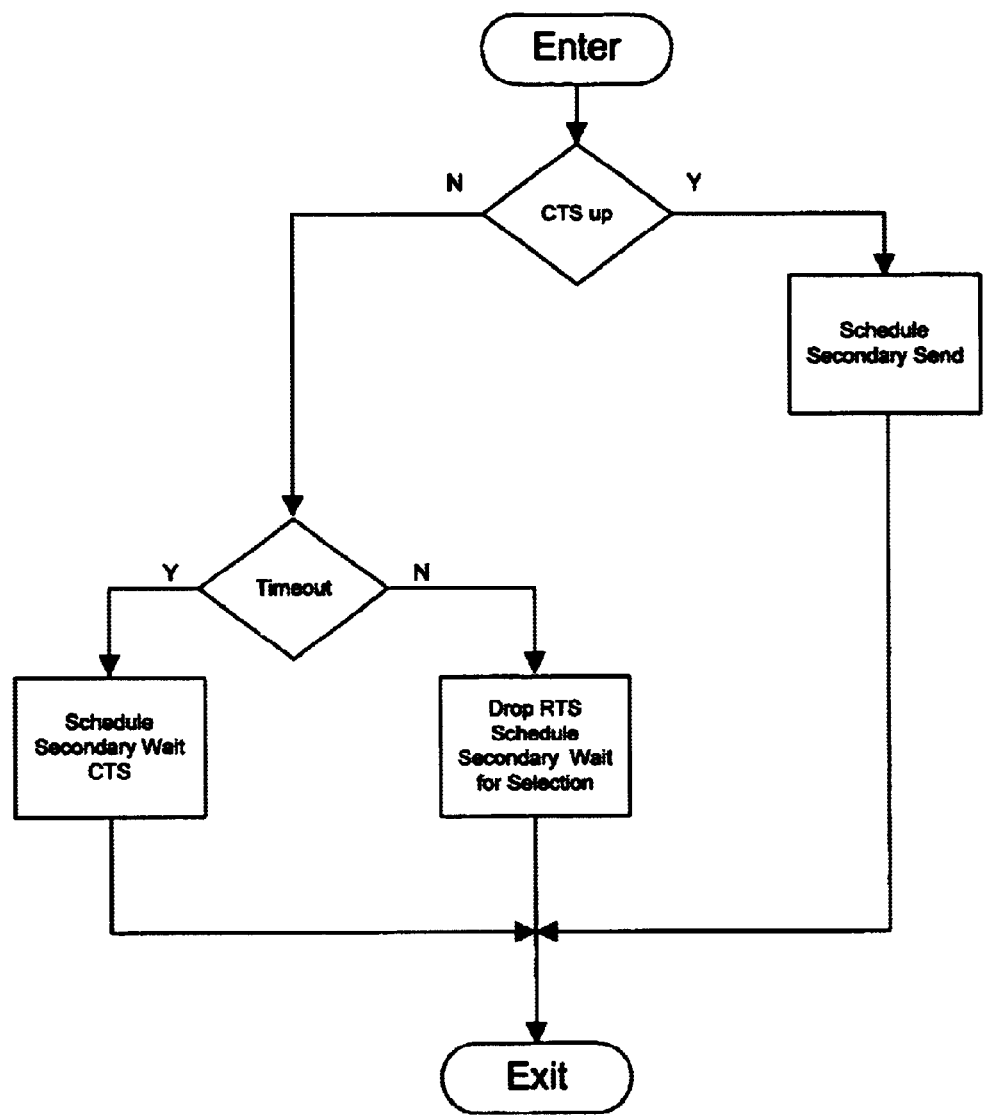
Figure 31:
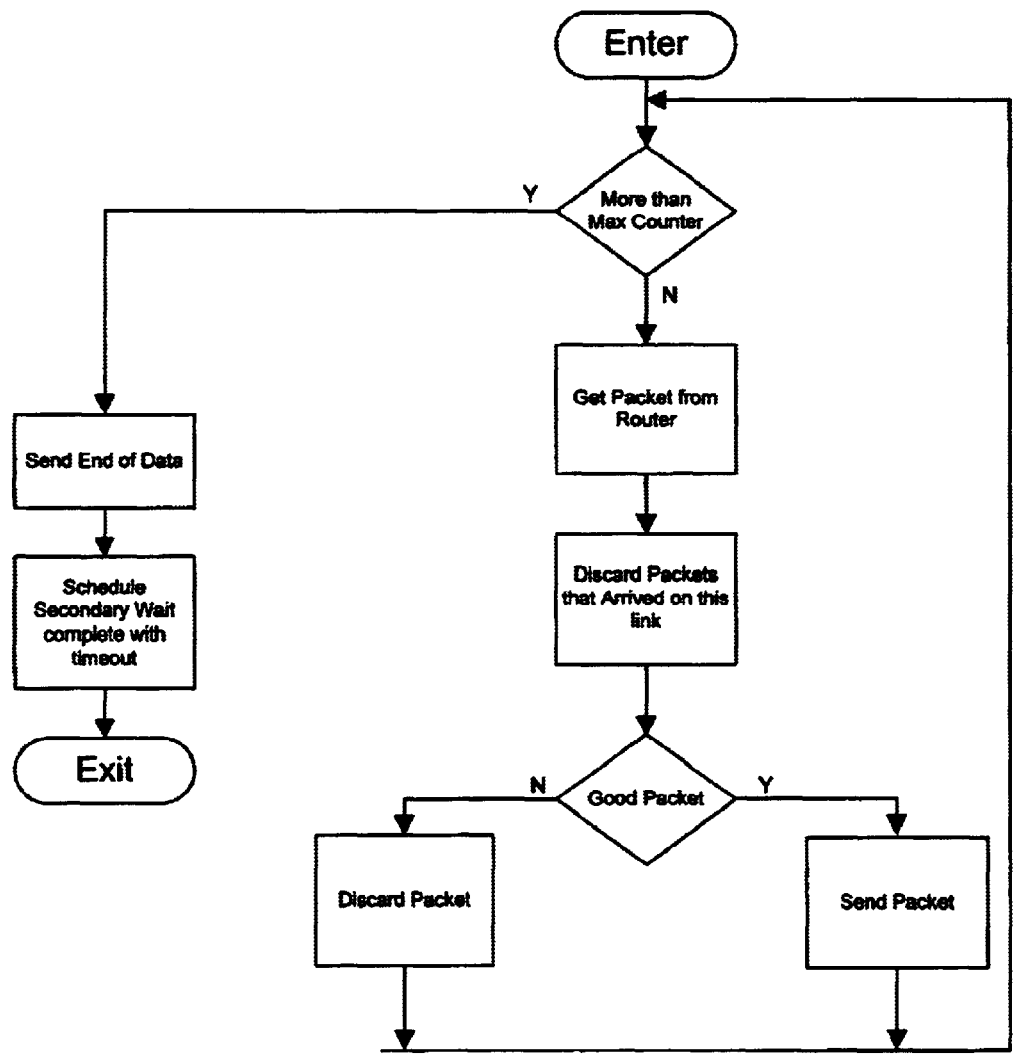
Figure 32:
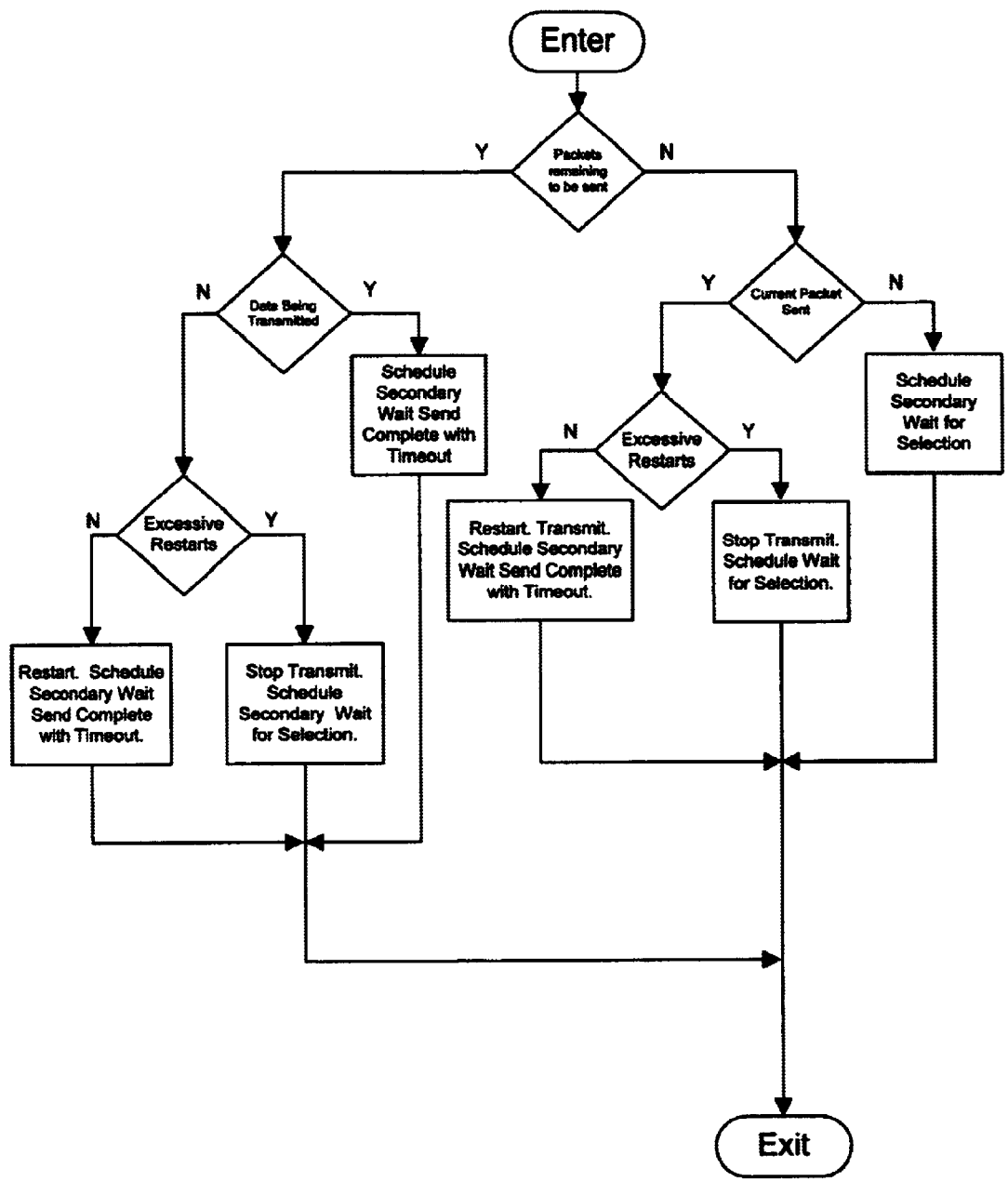
Figure 33:
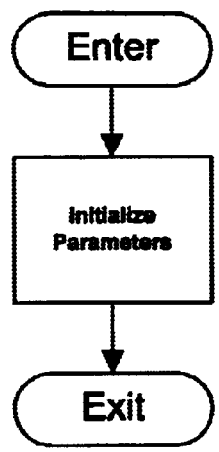
Figure 34:
Figure 35:
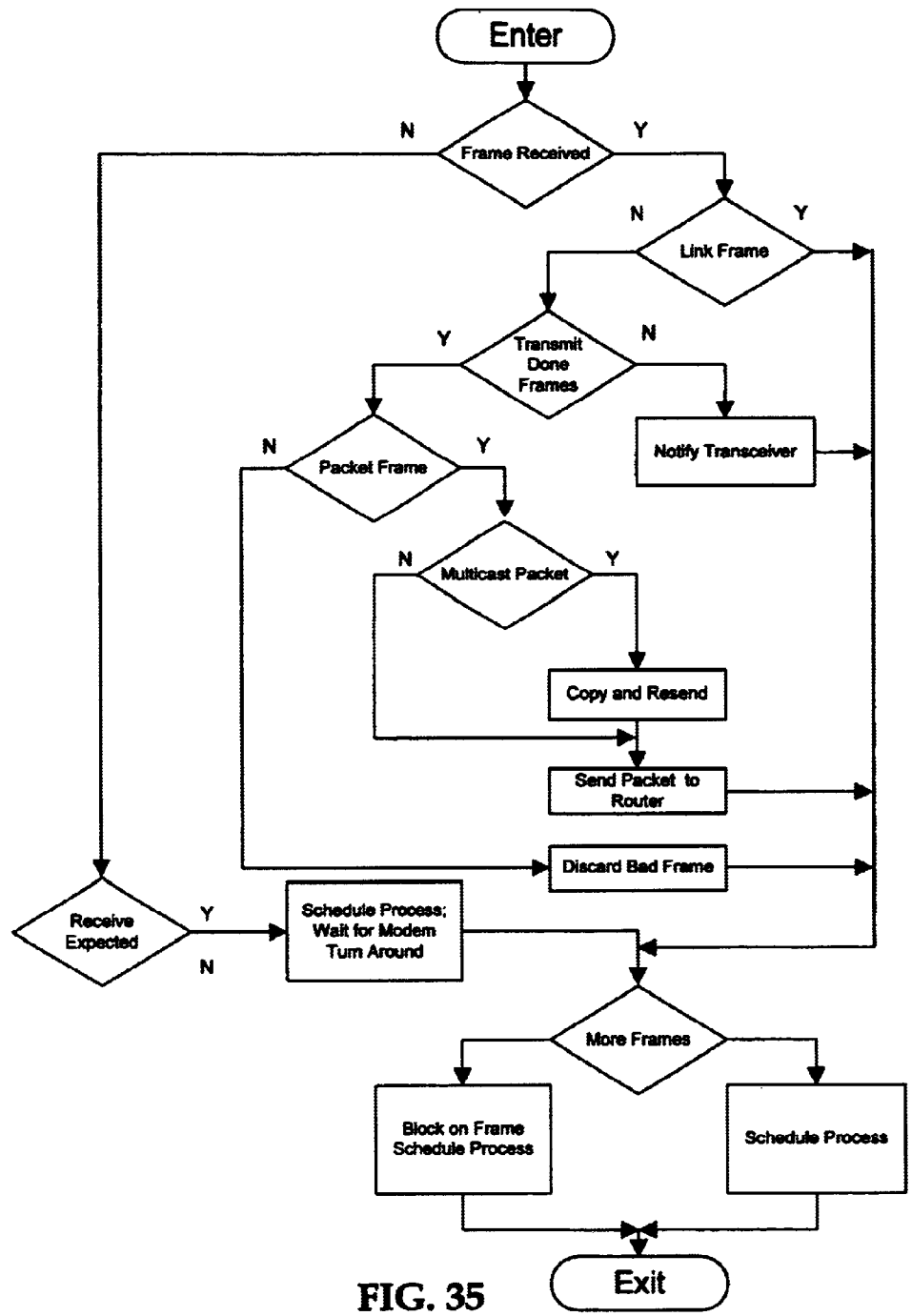
Figure 36:
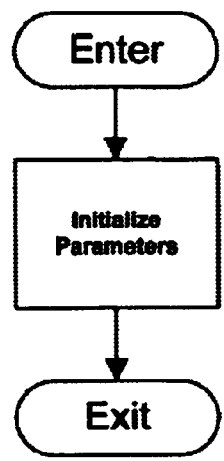
Figure 37:
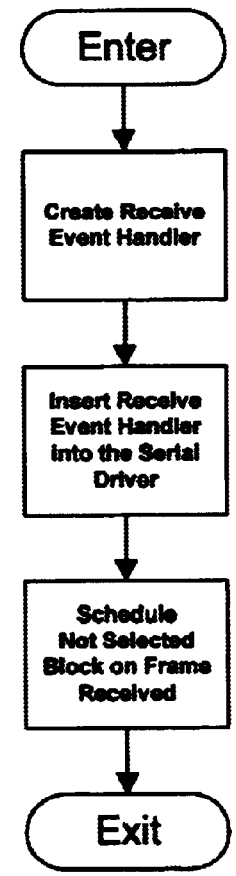
Figure 38:
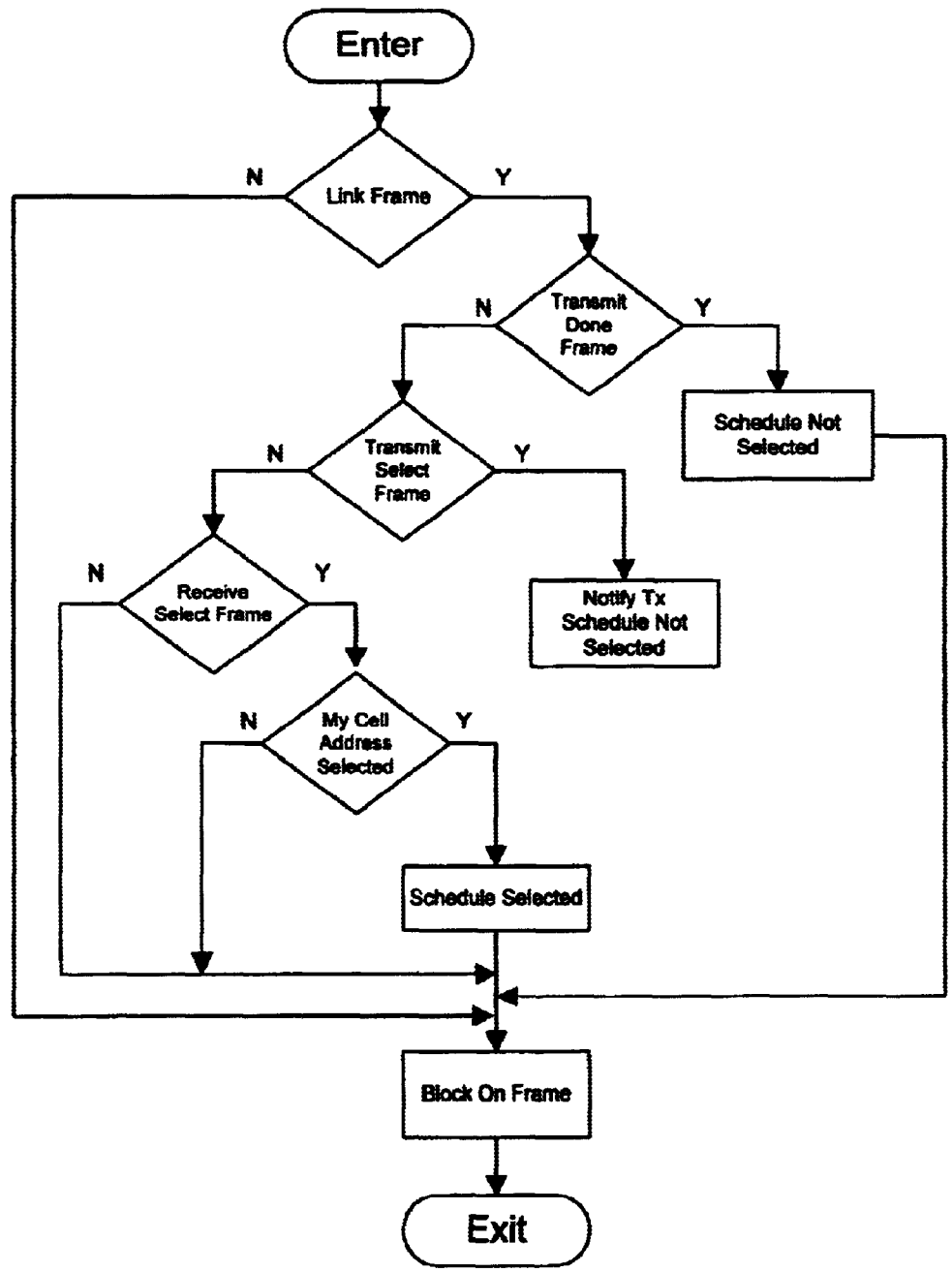
Figure 39:
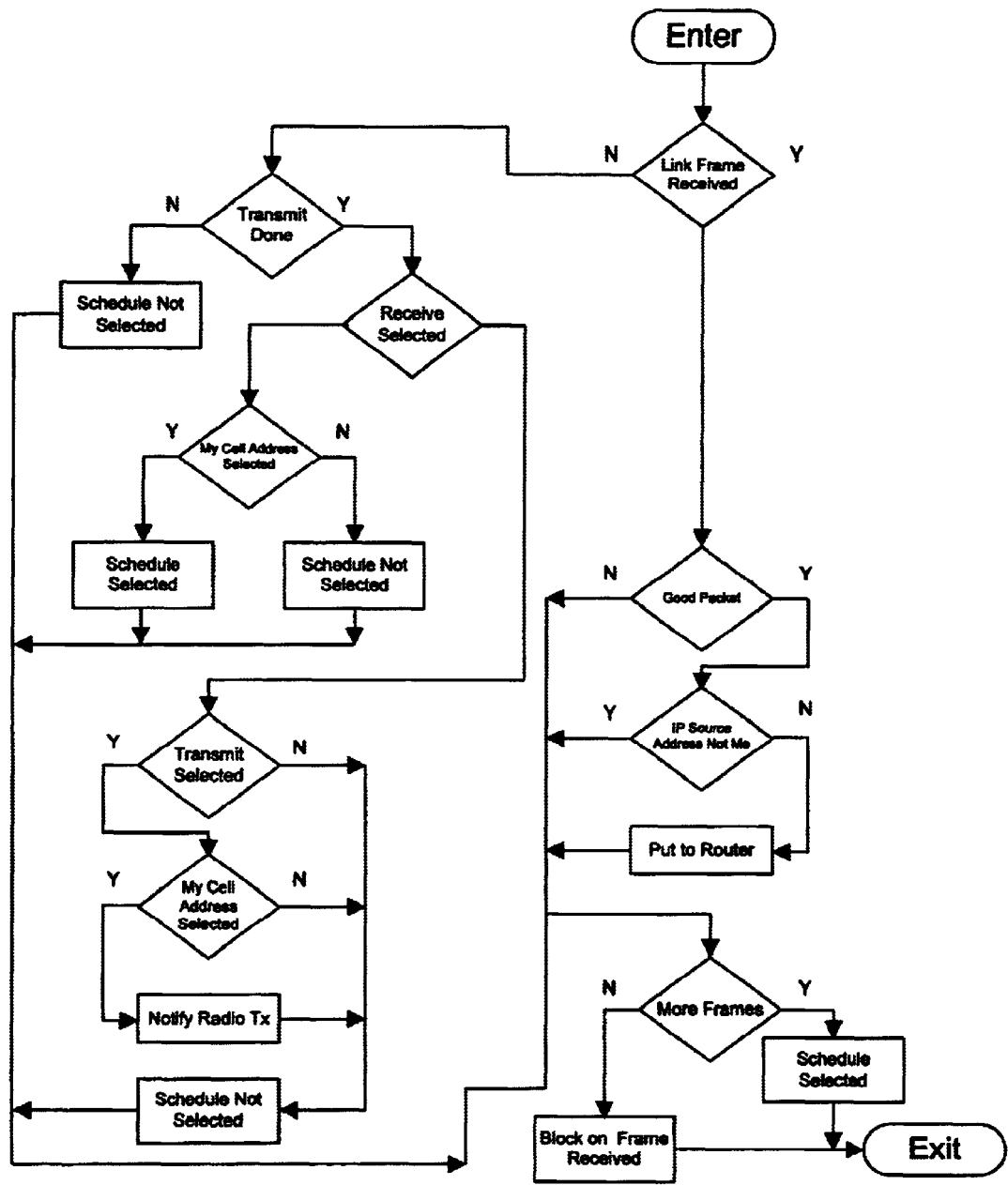
Figure 40:
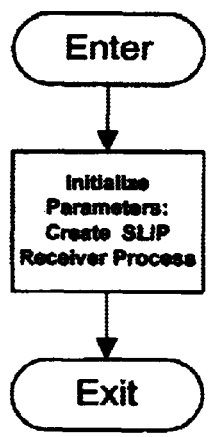
Figure 41:
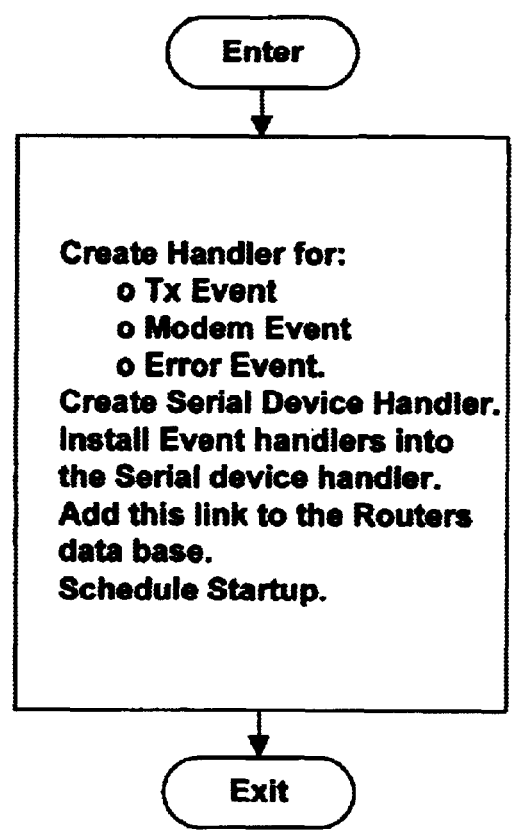
Figure 42:
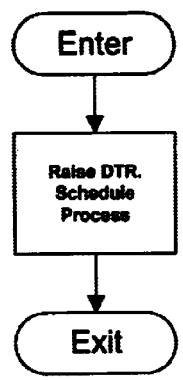
Figure 43:
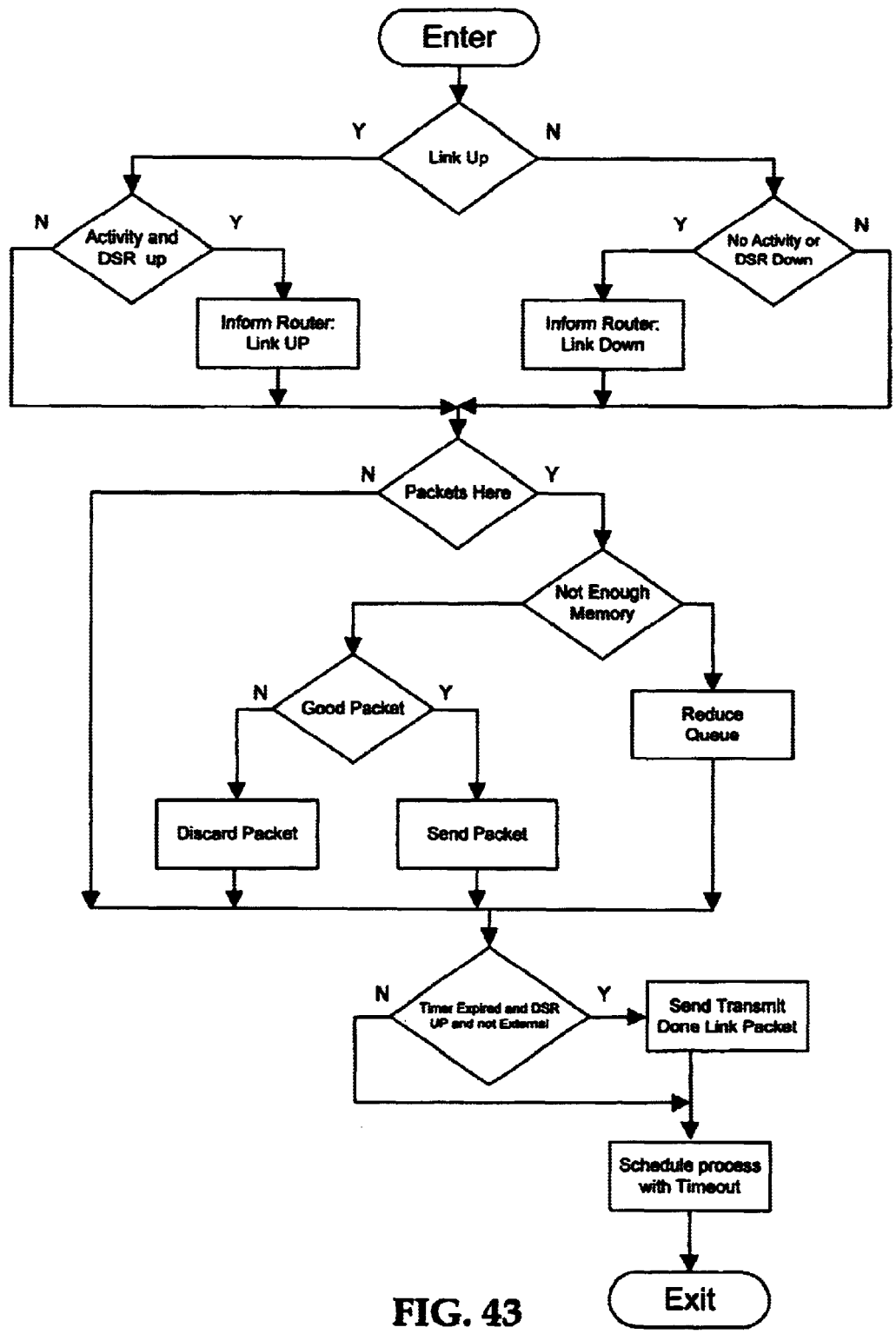
Figure 44:
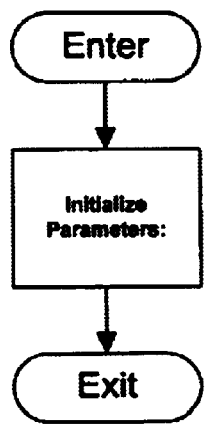
Figure 45:
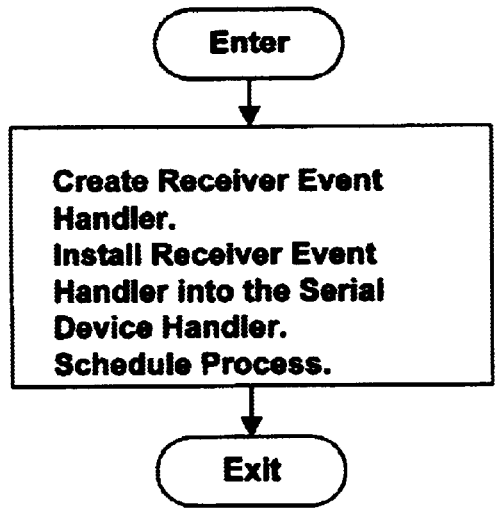
Figure 46:
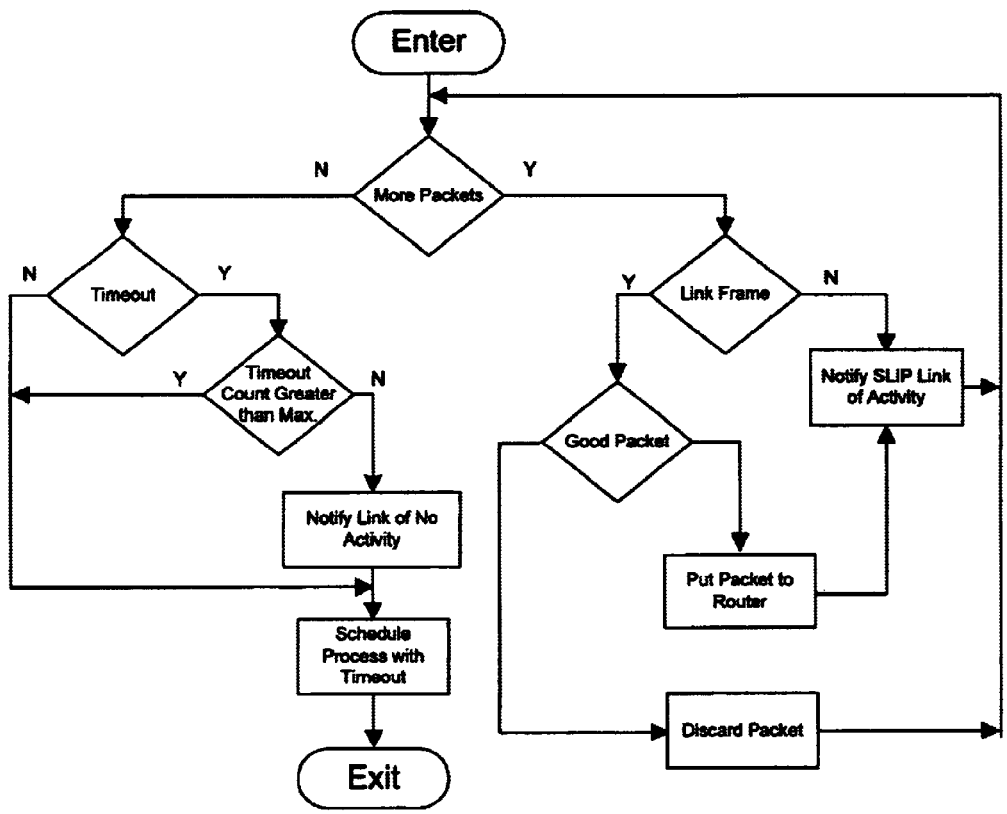

The final step in setting-up the net watch tool for your network, is to select the recorded links you want to test. In the displayed window, click on Check Integrity Probe button or choose Integrity Probe under the Tools menu. The Integrity Probe Control window pops-up (FIG. 9).

Click on the Add button and choose which links you want to test. If all the links require testing, choose Select All Addresses and click Done button. Now go back to the net watch tool window and save this test file under an appropriate name.

Open Stored Test File

To open a saved NET file, choose Open under File menu, or click on the Open File icon. If the file is loaded properly, a new name should be in the top box of the net watch tool window.

Using NetWatch

Once the test file is loaded, go to the integrity probe window (click on). Before starting the test, set the probe interval. This determines how often probe packets are sent. Probe Interval Settings are in milliseconds, e.g.: 1000 ms equals to 1 sec. To start the test press Start button in the Integrity Probe window. The net watch tool starts to send packets to different stations and log returned packets.

Information can be obtained from the window shown in FIG. 10.

Name, address, and description of station the probe has just sent to (Station 3, 192.3.2.1, CNX3), statistics about round trip time (110 ms), number of packets sent and received (4/4).

To find more details, press Find button, which leads the user in the window of FIG. 11.

Here the user can monitor status of all stations.

To go back to the Integrity Probe window, click on the Done button. To see more details on one of the stations, highlight the station you want to explore and click on the Details button. The window of FIG. 12 will pop-up.

This is the same information as can be seen on the Integrity Probe window, except the information doesn't change every time a new probe is send out. To go back to the previous window, click the OK button.

Glossary

The terms listed below will be found in error-messages and system operations description descriptions.

Ack: The transmission character used to indicate positive acknowledgment of a transmitted datagram message packet.

Automatic Route Discovery: An option that enables the control program to discover all available routes throughout the network automatically, instead of using static routes table.

Autonomous System: A network which is governed by automatic route discovery. An Autonomous System has all internal links and all routes use the same subnet mask.

Client Terminal: Any digital data source or receiver such as computers, SCADA, dumb terminals, Automatic Teller Machines, Credit card terminals, etc.

Client Protocol: A set of specifications including formats, timing, and rules that govern the functional operations of a digital data device in order to guarantee the accurate and reliable transmission of data between the client terminal and the system station.

External SLIP: a link that is outside an autonomous system, such as a network console.

Hub Station: A system configured to support system Multi-Point topologies.

Internal SLIP: a link that is within an autonomous network.

SYSTEM: A family Networking Equipment & Software solutions for building wide-area, multi-point, multi-access wireless data networks.

Naks: A transmission PDU sent to the sender, indicating that the decoded message packet has errors).

Primary Station: The system Station responsible for interrogating each secondary for outbound.

Null Modem Connection: A connecting cable used for direct serial communication between two stations.

PATHFINDER 9600: A synthesized UHF integrated 9600 baud transceiver used for wireless transmission of data. The PATHFINDER 9600 supports the frequency range of 385 to 512 MHz in six bands.

Pathwork: A set of software applications used as an aid in designing and evaluating the performance of a system circuits.

Relay Station: A system Station which receives, re-addresses and re-transmits the packets, to another system secondary or primary station, thus extending coverage.

Secondary Station: A system Remote Station working under the control of the primary.

Secondary Access Node: Same as system Secondary Station.

System Multi-Point Cell: Network in which each secondary station is linked to a primary station, via a rotating electronic token, which interrogates and notifies each station for data.

4.8.6 Summary

NetWatch can be used to test entire or portions of the network for any period of time. The user can turn on an audio annunciator in the Integrity Probe window ( ) and minimize the window. Every time a packet fails to return within the preset time window, a ping will be heard. If a series of pings occurs, the user should restore the Integrity Probe window and go to the detail display screen to examine the connectivity to each remote node.

Overview of Router Functions

An Internet Protocol (IP) router is considered to contain three distinct sets of operations. The first set is the physical interface to the communications hardware. The host computer itself may be thought of as a physical interface; it communicates with the application processes. The second set is the link handlers that prepare the Internet packet for transmission over the physical interfaces and receive the packet over the physical interfaces. The link handlers must also handle the configuration of the physical interface and any negotiations between the various other link handlers that share a physical interface. The set of operations that send and receive packets from applications executing on the host computer may be considered a link handler also; it is the host link. The third set is the routing functions that decide which of the link handlers to use for a particular packet based upon its destination address. One of the link handlers available to the routing operations is the host link. All IP packet arrive at the routing functions through one of the links and most packets depart the routing functions through one of the links; it can happen that an arriving packet is not re-routed but simply discarded.

Description of the Routing Functions

The routing functions receive packets from the links and send the packets to other links. The routing functions obey the IP subnetting rules. The host machine is considered a link with its own set of addresses both of its native link addresses and of its multicast addresses.

Description of the Link Handlers

A link handler moves data from the current station to one or more stations that may share the link. Links have several queues for holding data. The queues are prioritized by the IP packet Type Of Service (TOS) field. By maintaining separate data structures for different TOS groups, the link is able to send packets with a Minimize Delay TOS before other packets.

Host Link

The host link is responsible for sending data to and from the applications on the host processor. The normal model for such host communications is a socket. The host link is also responsible for the Internet Control Message Protocol processing.

Serial Radio Links—Point to Multipoint

A point to multipoint link is a link in which several stations communicate over a single channel. In order to control access to this channel, one station is designated as the primary (master) and the other stations are designated as secondary (slaves.) The systems point to multipoint link comprises several parallel channels. Parallel channels must all have the same set of stations. Point to Multipoint processing is accomplished by several cooperating event driven finite state automata (each referred to as a process.) A description of each of these processes follows. The following description refers to the Link Process.

The link process is responsible for starting up a transmit process for each channel. Operationally the link process receives packets from the routing functions and distributes them among the operational channels. The link process does not control access to the various channels. That function is controlled by each channel independently.

Creation and Initialization

The creation function initializes the link parameters and creates a Radio Transmit Process for each channel. The initialization function initializes each of the Radio Transmit Processes, it then adds the link and its IP address to the routing data base and schedules the Outgoing Packet Handler for dispatching.

Outgoing Packet Handler

The outgoing packet handling state distributes the packets to one of the working channels. There is little for the state to do on a secondary station except to insure that the input queue does not overflow and to check the state of all the channels, if all of them should quit working then route discovery is started (where available) to find replacement routes. The Radio transmit process for the secondary may simply dequeue a packet from the link queue when it has been selected for transmission.

For a primary station, on the other hand, the processing is more involved since a transmission channel must be selected. In such a way that the channels are well used. Since channels may not operate at the same speed, it is not suitable to use each channel equally. Instead, the outgoing packet handler tries to maintain the queues to the various working radio transmission processes at equal length. If there are no working channels then route discovery is started (where available) to find replacement routes.

Radio Transmit Process

The Radio Transmit process controls transmission of frames on a single channel. This process comprises a multitude of states. The states are divided into two parts one for a primary station and the other for a secondary station. A primary station state never schedules a secondary station state and vice versa.

There are two kinds of frames, a link frame and an IP frame. Both kinds of frame use SLIP framing and the first character of the frame is used to discriminate between IP and link frames. The link frames are really channel frames since the data they pass between the primary and secondary are used to control the channel. Link frames are used to:

Control secondary access to the channel.

Control bandwidth allocation to the secondaries.

Control inclusion of new stations into the cell.

Mark the end of channel usage (end of transmission.)

Creation and Initialization

The Radio Transmit Processes are created and initialized by the Point to Multipoint Link Process. At creation time the Radio Transmit process initializes its parameters. At initialization time it creates the serial device handler for its channel and then creates event handlers for the transmit, modem change, and error interrupts and installs them into the serial device driver. If the station is a primary the initialization either schedules the state that waits for the Data Set Ready (DSR) signal from the modem or, if DSR is present, schedules the state that begins the polling. If the station is a secondary, the initialization schedules the state that waits for the secondary to be selected for transmission by the primary.

Primary Wait for DSR

This state waits for the radio modem to present DSR. When that event occurs, the state which does the polling is scheduled. If the modem allows full duplex (simultaneous transmission and reception), the Request To Send (RTS) signal is presented to the modem.

Primary Poll

Each secondary station has associated with it an earliest time of the next poll. When the real-time clock exceeds that value, the station becomes eligible for receiving an invitation to transmit (a poll.) Each station also has a polling interval, which is a number that when added to the current value of the real-time clock yields the earliest time of the next poll. Every time a station is polled, its polling interval is multiplied by a number greater than one and has a small constant added. When the receiver process detects that a secondary station has responded to the poll, it sets the polling interval to zero and resets the earliest time of the next poll to the value of the real-time clock, thus making the station eligible for an immediate poll. This algorithm allows non responding secondary stations to be quickly removed from the polling, but also makes the penalty for a single missed poll (perhaps due to radio interference) slight. A parameter of the link determines the maximum interval between polls of a non-responding station.

The primary can use the recent response patterns of the secondaries to allocate bandwidth among them by including a maximum packet count in the invitation to transmit.

The primary can offer a chance for a secondary that is not included in the polling to become included by giving a invitation to register, in which any secondary may transmit a registration link frame. If any such frame is received by the receive process, it can be acknowledged by the primary and the station included in the polling. Of course this invitation to register may be answered by more than one secondary, in which case the responses would be scrambled at the primary and a frame specifying that no registration occurred would be sent. The secondaries would then have to back off and wait for some random number of registration invitations to pass before re-attempting a response.

The primary selects a secondary for polling if no secondary is currently using the channel and if there is a secondary which has an earliest time of next poll prior to the current value of the real-time clock.

If there are no packets for the primary to send and if none of the secondaries is currently eligible for a poll, the Primary Poll state reschedules itself and exits back to the dispatcher. If, however, the primary does have some frames to transmit, it schedules either the state that sends the frames (Primary Send), if it has a full duplex channel, or it schedules the state that waits for the currently selected secondary to clear the channel (Primary Wait For No DCD.)

Primary Wait for no DCD

This state waits until the Data Carrier Detect (DCD) signal from the modem is dropped. The absence of this signal means that no secondary is using the channel. When the absence of DCD is detected, RTS is presented to the modem to begin transmission by this station. The state of the Clear To Send (CTS) signal of the modem determines whether a state to wait for CTS (Primary Wait For CTS) must be scheduled or whether the state that performs the send can begin immediately (Primary Send.)

Primary Wait for CTS

This state waits for the modem to present the Clear To Send (CTS) signal. When that signal is detected, this state schedules the state that performs the send (Primary Send.) If CTS is not detected after a reasonable time, the entire primary state machinery is restarted at Primary Wait For DSR.

Primary Send

This state sends (actually it queues frames to the device driver) outgoing packets that may have been queued to it by the Point to Multipoint Link Process' Outgoing Packet Handler state up to its maximum share of the channel bandwidth. If a secondary has not been selected, it then sends and end of transmission link frame. If a secondary has been selected, it sends an invitation to transmit frame to the secondary and increases the polling interval of the secondary before setting its earliest time of next poll. It then schedules a state to wait for the transmission to complete (Primary Wait For Send Complete) and exits to the dispatcher.

Primary Wait Send Complete

This state waits until all of the frames that have been queued to the device driver have been sent before rescheduling the Primary Poll state. The big problem with this state is that interrupts may not be generated by the transmitter hardware and so the transmission may need to be nudged into activity again. This state reschedules itself with a fairly short timeout while watching the state of the transmitter. It appears to have stopped it is nudged in activity. After a given number of nudges the transmission is abandoned and Primary Poll is scheduled anyway.

Secondary Wait for Selection

This state waits until it has received notification from the Secondary Receive process that transmission is allowed. If the radio is full duplex it schedules the Secondary Send state. Otherwise it must schedule the state that waits for the primary to clear the channel before starting transmission Secondary Wait For No DCD.)

Secondary Wait for no DCD

This state waits for the primary to complete transmission and release the channel. Channel release is detected when the modem stops presenting the Data Carrier Detect signal. When the loss of the signal is detected, this state raises Request to Send (RTS) to begin its own transmission. It checks to determine whether the modem is presenting Clear To Send (CTS). If so, sending can begin immediately and the state Secondary Send is scheduled. If not, then the secondary must wait for the CTS signal to be presented by the modem so the state Secondary Wait For CTS is scheduled.

Secondary Wait for CTS

This state waits for the modem to present the Clear To Send (CTS) signal. When the signal is detected, the state that performs the send, Secondary Send, is scheduled. If CTS is not presented within a reasonable time, the attempt to send is abandoned and the initial state, Secondary Wait For Selection is scheduled.

Secondary Send

This state retrieves IP packets directly from the Link process queue and queues them to the device handler queue. It limits the number of packets it queues to the device handler based on the packet count contained in the invitation to transmit from the primary. Each packet is checked to insure that it has a good frame check sequence and that its time to live has not been exceeded and that it did not arrive on this link (that means that it was misdirected by the primary). If any of these conditions hold the packet is discarded. After all of the outbound IP packets have been queued to the device handler, an end of transmission link frame is queued to the device handler. The state Secondary Wait For Send Complete is scheduled with a timeout and this state exits to the dispatcher.

Secondary Wait Send Complete

The big problem solved by this state is that the transmission hardware occasionally drops interrupts so that the sending process stops prematurely. This state watches over the transmission process by rescheduling itself at short intervals and checking on the progress. If the transmitter has stopped prematurely it is nudged back into action. If too many nudges are required the transmission is abandoned. After the transmission successfully completes or is abandoned, the initial state, Secondary Wait For Selection, is scheduled and this state exits back to the dispatcher.

Primary Receiver Process

The Primary Receive Process is responsible for receiving frames at a primary station.

Creation and Initialization

Both the creation and initialization functions are called by the Radio Transmit Process. The creation function initializes the parameters. The Initialization function creates and initializes the receive event handler and then inserts the event handler into the serial device driver. It then schedules the main state, Process, and blocks the process on reception of a frame before returning the caller.

Process

This state processes a single received frame. If more frames are available it reschedules itself with no block. If no more frames are available it reschedules itself with a block on the reception of a frame.

If the received frame is a link frame it must notify the Radio Transmit process of the frame. If the frame is an IP packet, the state must determine whether the packet has a multicast destination address and if it does, copy it and enqueue it onto the Link process' outgoing packet queue. The original packet, multicast or not, is enqueued to the router.

Secondary Receive Process

The Secondary Receive process is responsible for receiving frames from the primary and then acting upon the frames that are destined to this station.

Creation and Initialization

Both the creation and initialization functions are called by the Radio Transmit Process. The creation function initializes the parameters. The Initialization function creates and initializes the receive event handler and then inserts the event handler into the serial device driver. It then schedules the initial state, Not Selected, and blocks the process on reception of a frame before returning the caller.

Not Selected

This state receives frames from the primary waiting for a frame that selects this station for reception or transmission when such a frame is received it either notifies the Radio Transmit task or schedules the state Selected.

Selected

This state receives frames destined for this station. It must examine link frames to determine when the primary selects another station. When this occurs, it schedules the state Not Selected, blocks waiting for a new frame and exits to the dispatcher. It must also examine the IP source address of the packet to insure that it has not received a packet destined from this station to another station in the cell. This state only receives one frame before yielding control to the dispatcher. If there are more frames available it reschedules itself. If there are no more frames available it reschedules itself and blocks waiting for a received frame.

SLIP

Serial Line Internet Protocol (SLIP) is an unofficial standard that is very frequently used in the internet world to move Internet Packets over serial lines. It defines a simple framing sequence and escape sequences to allow binary data to be sent with no danger of a data character being mistaken for a framing character. Metric Systems has added non-IP link frames to SLIP to allow one side of the link to exchange link data with the other side. Currently the only data exchanged is an occasional keep-alive frame when no other data is flowing across the link. The keep-alive frame prevents an internal link (an internal link is one that links two Metric Systems routers) from being declared down. When an internal link goes down, route discovery is started (if available) to find alternate paths. Link frames are never sent on external links to equipment other than that of Metric Systems.

SLIP Link Process

The SLIP link process is responsible for setting up both of the processes necessary for SLIP communications and also for informing the router of the links presence and also for creating the serial device handler. In addition there is within the link process a finite state automaton for handling the transmission of packets and link frames.

Creation and Initialization

The creation function initializes parameters and creates a SLIP Receiver process. The initialization function creates and initializes event handlers for transmission events, modem events, and error events. It creates and initializes a serial device handler and sets the event handlers into the serial device driver. It initializes the SLIP Receiver process. It adds this link to the router's database. It then schedules the Startup state and returns to the caller.

Start Up

This state raises the Data Terminal Ready signal to the modem and then schedules the main state, Process., before exiting to the dispatcher.

Process

This state constantly re-schedules itself blocking on a time out and also packets being available from the router. The restart on timeout allow the state to send a link frame as a keep-alive if no other frames were sent and the link is internal. On every entry this state determines whether the link is up or down by analyzing the receiver activity and the state of the modem's Data Set Ready (DSR) signal. The router and its route daemon are notified of any change. If IP packets are available for transmission, one of them is checked and sent if its time to live has not expired. If there is not enough memory to safely operate, the Link queue is reduced to half its former size while preferably preserving routing packets and packets with immediate delivery type of service.

SLIP Receiver Process

The SLIP Receiver process is responsible for receiving frames from the other side of the link.

Creation and Initialization

The creation function initializes the parameters. The initialization function creates and initializes a receive event handler and sets it into the serial device handler. It then schedules the main state, Process, and returns to the caller.

Process

This state constantly reschedules itself with a wait. If no frames are received within several wait intervals it notifies the SLIP Link process of the lack of activity. If the frame is a link frame the SLIP Link process is notified of activity on the line. If the frame is an IP packet its header frame check sequence is examined and if it is good, the packet is queued to the router and the link is notified of activity. If it is not good the packet is discarded.

The serial device handlers control the hardware that communicates with the radios.

While particular embodiments of the present invention have been disclosed, it is to be understood that various different modifications are possible and are contemplated within the true spirit and scope of the appended claims.

There is no intention, therefore, of limitations to the exact abstract or disclosure herein presented.

What is claimed is:

1. A system for establishing wirelessly a wireless infrastructure network to communicate with remote terminal, comprising:

a protocol conversion module for converting time discrete input information to information formatted for sending to remote terminals in data packets;

a router module for internally routing said data packets;

said protocol conversion module for converting the time discrete input information into an Internet Protocol base protocol;

a wireless protocol module for creating at least one wireless communication link to the remote terminals;

wherein said wireless protocol module causes each individual remote terminal to periodically exchange a dynamically generated routing table indicative of all of the then available routes to each individual one of the remote terminals within an autonomous wireless communication system;

wherein said wireless protocol module further causes one remote terminal having a then available route to at least yet another individual one the remote terminals to be established as a primary station;

wherein said wireless protocol module still further causes all other remote terminals in said autonomous wireless communication system to be identified as secondary stations; and wherein said wireless protocol module further causes a point to multi-point link on a single wireless channel to be created between said primary station and only those secondary stations having a then available route to at least another individual one of the secondary stations;

a wireless device interface module for providing wireless transceiver interfacing; and at least one transceiver for responding to said interface module for sending information wirelessly to a remote terminal via the created at least one wireless communication link.

2. A system according to claim 1, wherein said time discrete input information is instrumentation time discrete information in an Internet protocol based protocol.

* * * * *